Dec. 14, 1954          A. F. ANJESKEY          2,696,920
APPARATUS FOR HANDLING AND STORING COILED MATERIAL
Filed March 16, 1949          10 Sheets-Sheet 1
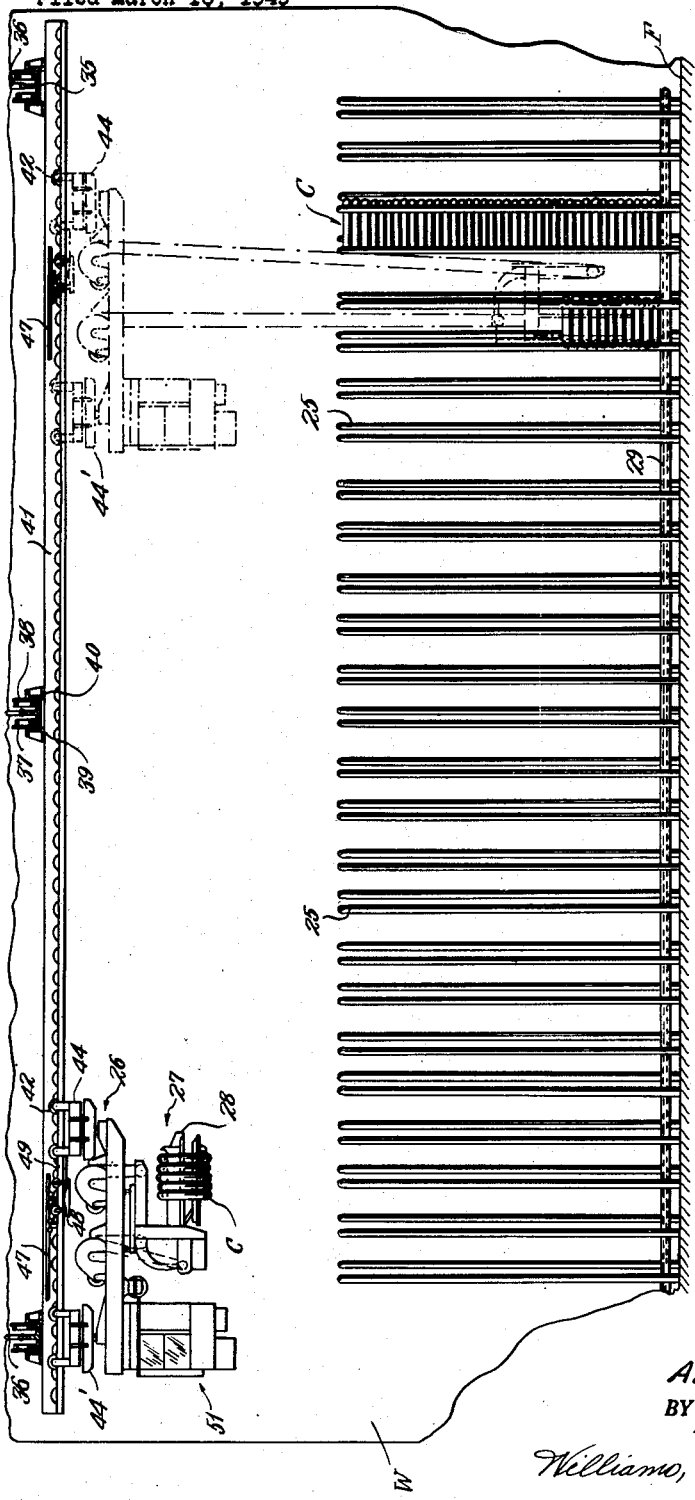
FIG. 1
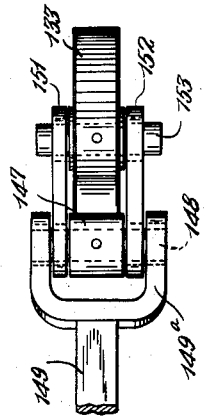
FIG. 15
FIG. 14
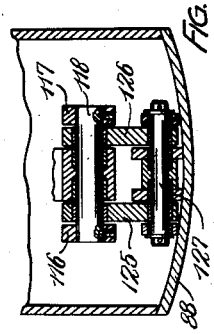
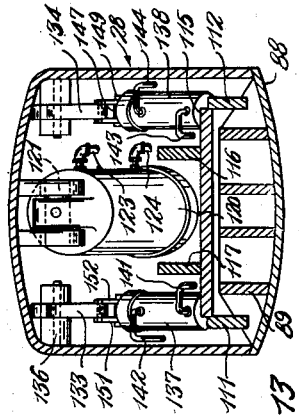
FIG. 13
INVENTOR.
ALPHONSE F. ANJESKEY
BY *Hudson, Boughton,*
*Williams, David, Hoffmann*
ATTORNEYS Dec. 14, 1954 A. F. ANJESKEY 2,696,920
APPARATUS FOR HANDLING AND STORING COILED MATERIAL
Filed March 16, 1949 10 Sheets-Sheet 2

INVENTOR.
ALPHONSE F. ANJESKEY
BY Hudson, Boughton,
Williams, David, Hoffmann.
ATTORNEYS Dec. 14, 1954  A. F. ANJESKEY  2,696,920
APPARATUS FOR HANDLING AND STORING COILED MATERIAL
Filed March 16, 1949  10 Sheets-Sheet 3

INVENTOR.
ALPHONSE F. ANJESKEY
BY Hudson, Boughton
Williams, David & Hoffmann
ATTORNEYS

INVENTOR.
ALPHONSE F. ANJESKEY

Dec. 14, 1954 A. F. ANJESKEY 2,696,920
APPARATUS FOR HANDLING AND STORING COILED MATERIAL
Filed March 16, 1949 10 Sheets-Sheet 6
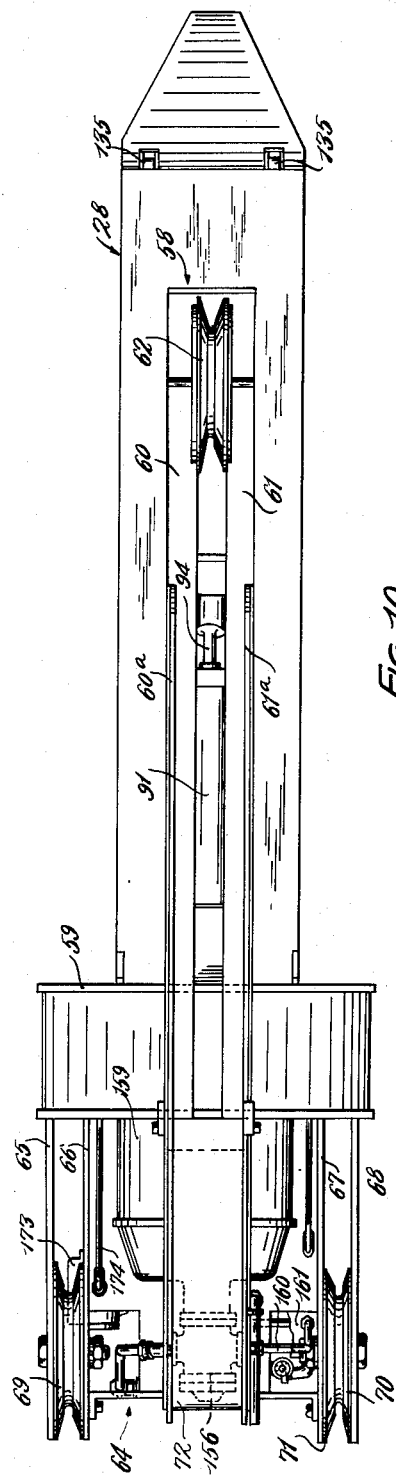
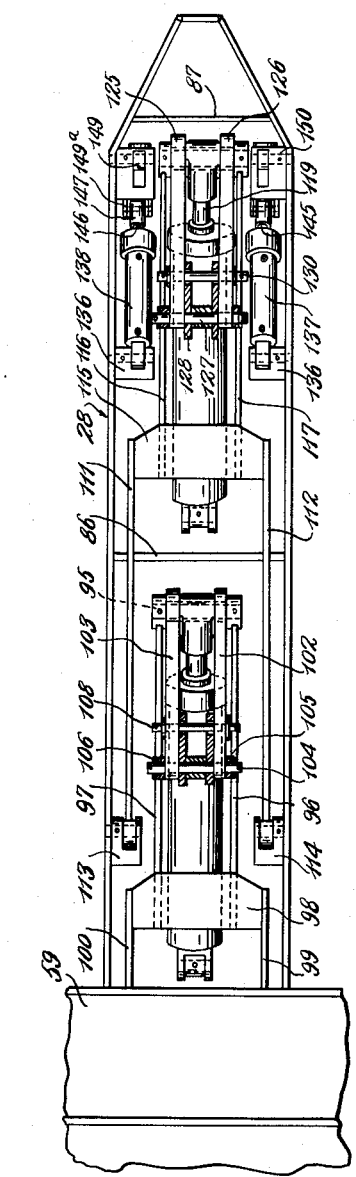
INVENTOR.
ALPHONSE F. ANJESKEY
BY Hudson, Boughton,
Williams, David & Hoffmann
ATTORNEYS INVENTOR.
ALPHONSE F. ANJESKEY
BY Hudson, Boughton,
Williams, David & Hoffmann.
ATTORNEYS

INVENTOR.
ALPHONSE F. ANJESKEY

INVENTOR.
ALPHONSE F. ANJESKEY

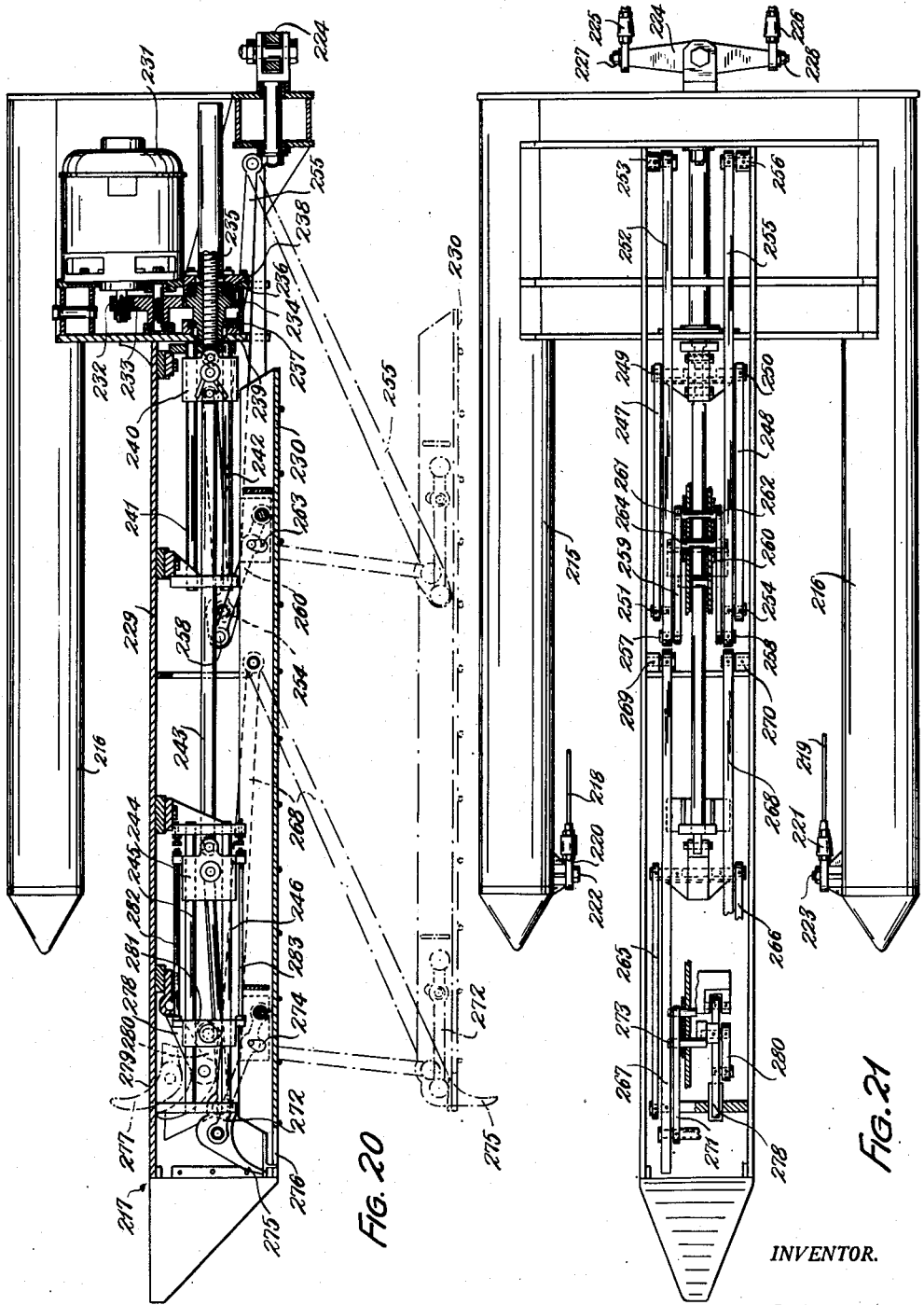

United States Patent Office 2,696,920
Patented Dec. 14, 1954

2,696,920

APPARATUS FOR HANDLING AND STORING COILED MATERIAL

Alphonse F. Anjeskey, Cleveland, Ohio, assignor to The Cleveland Crane & Engineering Company, Wickliffe, Ohio, a corporation of Ohio Application March 16, 1949, Serial No. 81,696

17 Claims. (Cl. 214—16)

This invention relates to a method of, and means for, storing and handling material in tubular or annular form with central apertures therethrough and, more particularly, material such as coils of wire, rod, metal, and the like.

The storage and handling of various annular bodies presents similar problems and, while this invention is susceptible of utilization with a wide variety of annular bodies, it is especially adapted to the handling and storing of coils of wire, rod, and the like, and therefore the subsequent description will, for simplicity, be confined largely to the storing and handling of such material. It is to be understood, however, that this restriction of the description to use of the invention with coiled material is simply to facilitate the disclosure and is not to be considered as a limitation of the invention.

Heretofore, coiled material, such as coils of wire, rod, and the like, has been stored with the axes of the individual coils in a substantially horizontal position and, in order to conserve space, it has been necessary that the coils be more than one layer high. When stored in this manner, the weight of the coils in the upper layer or layers tends to deform the coils therebelow, and when the warehouse or storage area contains coils of different dimensions or of different analyses, the selectivity is very poor, since the coil or coils having the characteristics desired at a particular time may be at the bottom with four or five layers of other coils on top so that it is necessary to move a very considerable tonnage of material to reach the coil or coils desired. Furthermore, when coiled material is stored in the manner referred to, there is danger of the coils rolling or sliding unless framework is provided for retaining the coils in position. Such framework is relatively costly, since it must be quite strong and requires considerable fabrication and, in addition, it reduces the tonnage of coiled material that can be stored in any given storage area without increasing the selectivity of the storage.

Another disadvantage of the prior method of storing coiled material in the manner mentioned above is that much of the storage space cannot be utilized due to the necessity for leaving clearance at the ends of the rows of stored coils to permit use of conventional coil handling equipment, such as the hook disclosed in the Bennington patent, No. 1,546,364. This is due to the fact that, while such a hook may be tilted to facilitate its entrance into, or its withdrawal from, the coils, the hook must be left substantially horizontal when lifting, lowering, or transporting the coils to prevent the latter from sliding from the hook so that a clear space, equal to or greater than the length of the hook, must be left at the end of each row of coils.

One of the principal objects of this invention is to provide an improved method and apparatus for storing bodies having central openings, for example, coiled material such as wire, rod, and the like, whereby the material is stored with the axes of the individual units extending substantially vertical.

Another object of the invention is to provide an improved method and apparatus for storing and handling bodies having central openings, such as coiled material, for example, wire, rod, and the like, which method and apparatus is such that the bodies or coils are stored with their axes extending substantially vertically and are placed in and removed from storage by material handling means movable over the storage area and adapted to be inserted into or withdrawn from the material in a substantially vertical position, said material handling means being adapted to retain the bodies thereon whether the handling means be disposed so that the axes of the bodies are horizontal, vertical or at an angle thereto.

A further object of the invention is to provide an improved apparatus for handling annular bodies, such as coils of wire, rod and the like, comprising an elongated member adapted to be inserted into the central openings of the bodies to be handled and provided with means for preventing the bodies from sliding off said member when the latter is inclined to the horizontal, whereby the bodies may be moved from positions in which the axes of the bodies are horizontal to positions in which the said axes are vertical, and conversely, as well as permitting movement of the bodies with their axes substantially horizontal.

An additional object of the invention is to provide a material handling apparatus of the type defined in the preceding paragraph and in which the said means for preventing displacement of the annular bodies from the elongated member includes a finger-like member or members adapted to be projected transversely outwardly from said elongated member adjacent the end of the latter.

A still further object of the invention is to provide a material handling apparatus of the type mentioned comprising a substantially U-shaped, hook-like member supported for horizontal and vertical movement and for tilting movement, the lower leg of said member being adapted to be inserted through central openings of annular bodies to be handled and expanded into contact with the side walls of such openings to thereby retain the bodies upon said handling member regardless of the position of the latter.

A still more specific object of the invention is to provide an improved material handling apparatus of the type mentioned in the preceding paragraph and in which the mechanism for effecting expansion of said one leg of the hook-like member comprises a hydraulic system carried by said member.

The invention also has as its object the provision of an improved material handling apparatus as defined in the two preceding paragraphs and in which the said one leg of the hook-like member is provided, adjacent its free end, with finger-like members movable to positions extending transversely outwardly from said leg in predetermined sequence with the expansion thereof.

The invention further resides in certain novel steps of procedure, features of construction, and combination and arrangement of parts of the apparatus, and further objects and advantages thereof will be apparent to those skilled in the art to which it pertains from the following description of the present preferred embodiment thereof, and certain modifications, described with reference to the accompanying drawings in which similar reference characters represent corresponding parts in the several views and in which:

Fig. 1 is a sectional view through a warehouse for storing annular bodies, such as coils of wire or the like, and illustrating one type of novel supporting structure for permitting storage of such bodies in accordance with the method of this invention, the novel material handling apparatus being shown in full lines in its material transporting position and in dot-dash lines in its position for depositing and/or removing annular bodies from storage;

Figure 9:
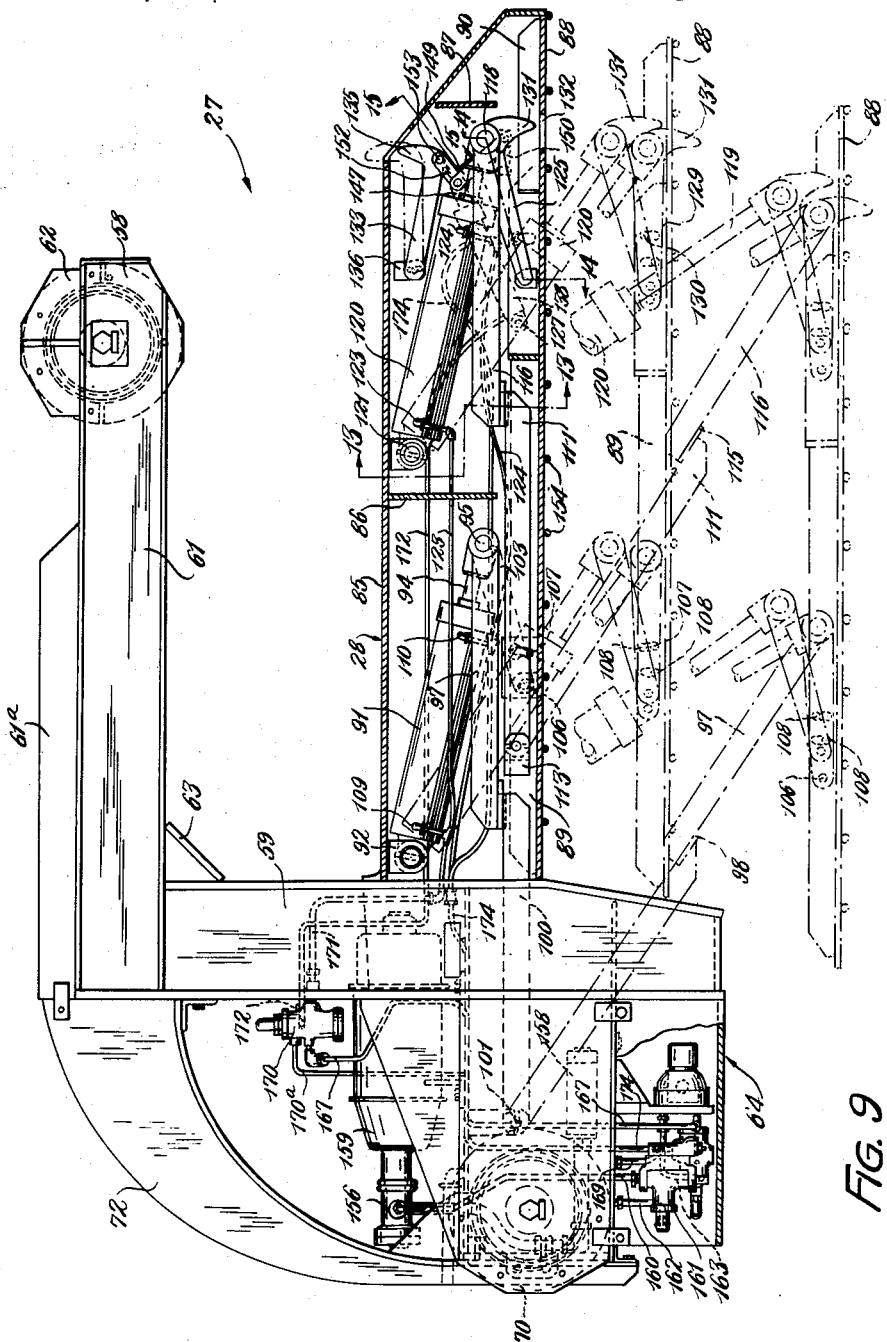
Figure 12:
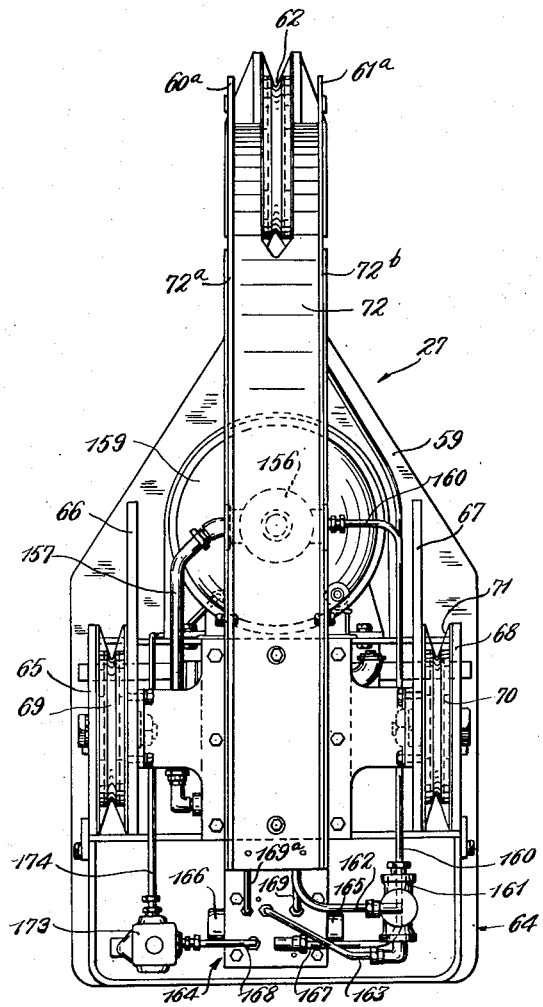
Figure 17:
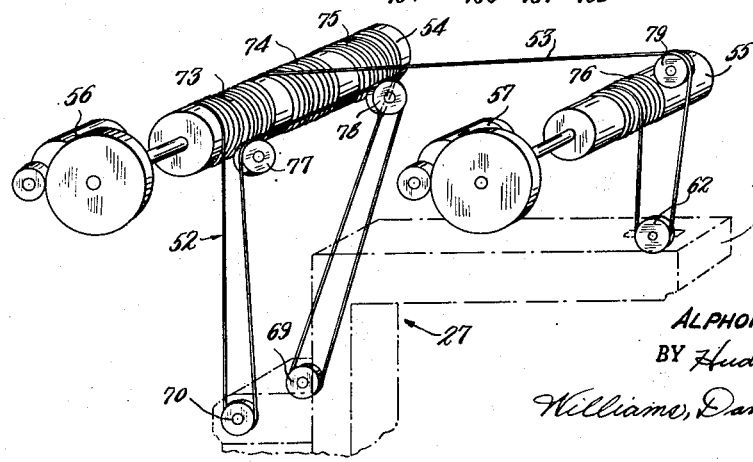
Figure 16:
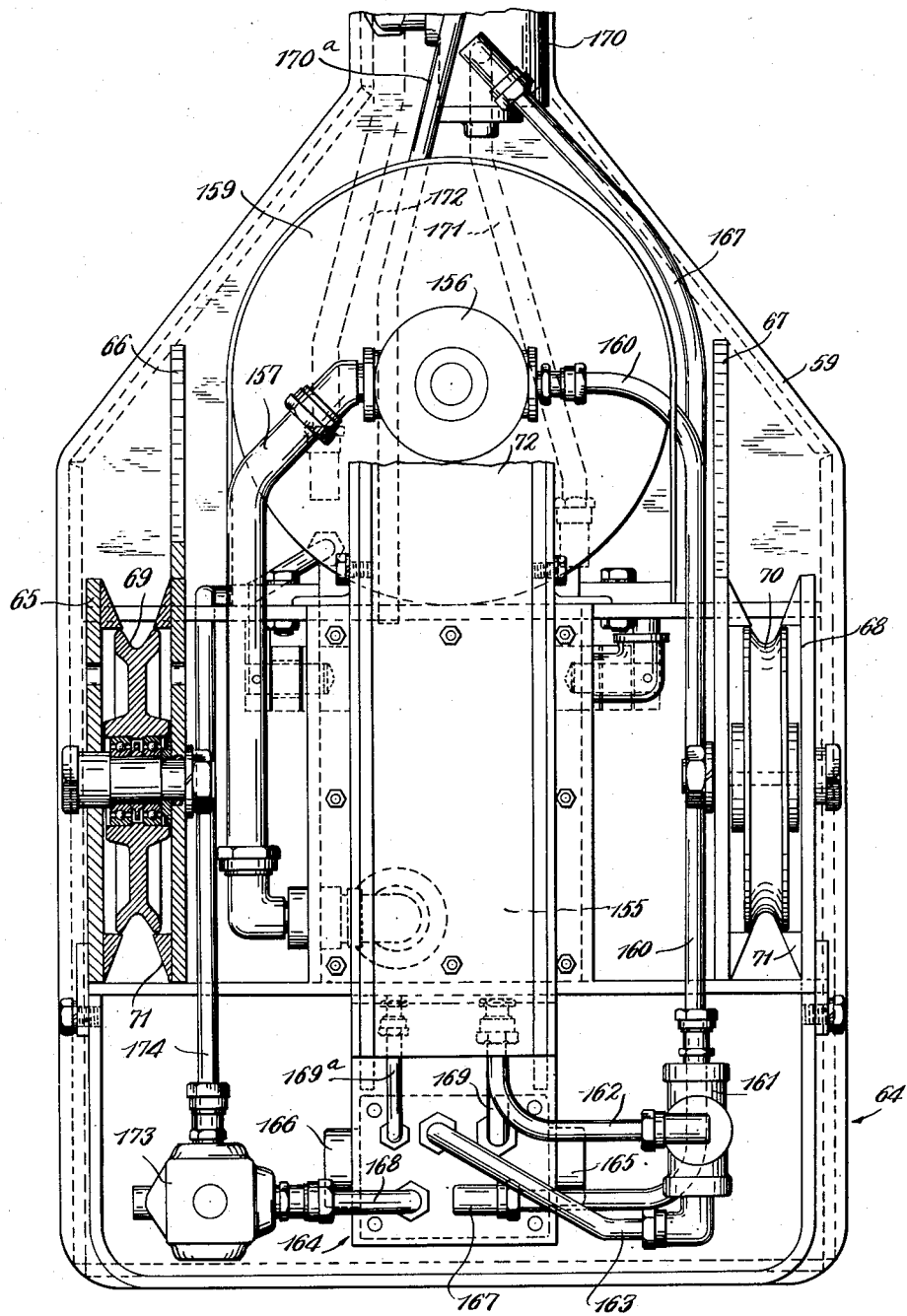
Figure 18:
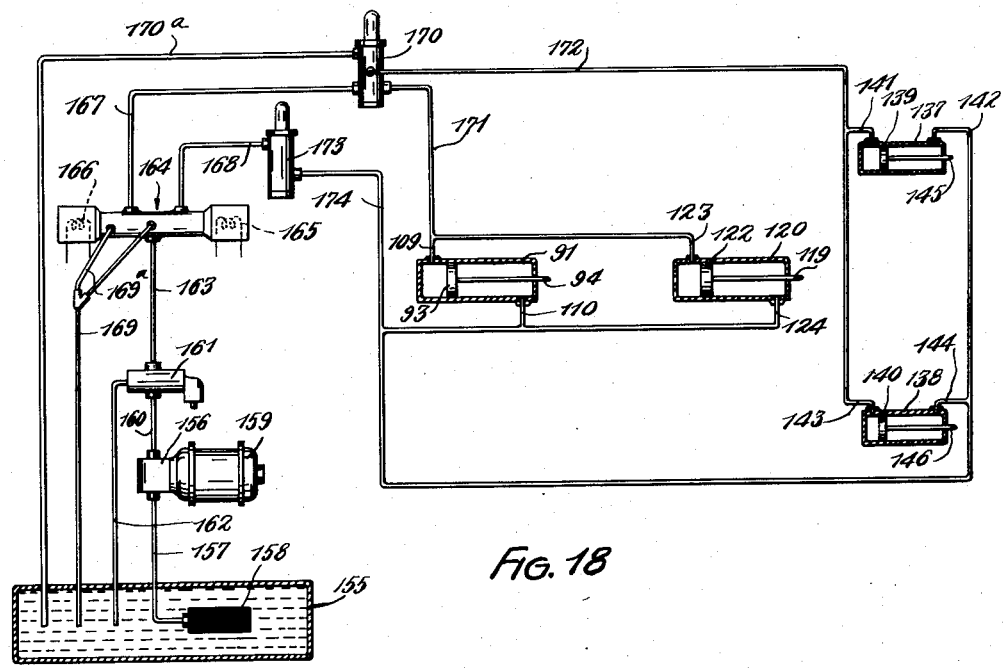
Figure 19:
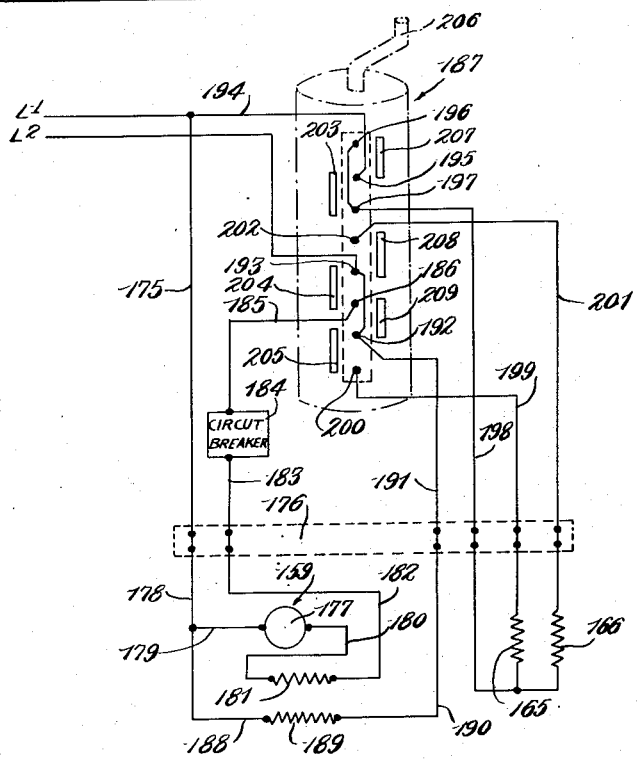

Fig. 9 is an enlarged detached view of that portion of the material handling apparatus herein referred to as the "hook", parts being broken away and others shown in section to more clearly illustrate the mechanism for expanding a portion of the hook and for operating the finger members provided thereon which prevent displacement of annular bodies carried on the hook, the movable portions of the hook being shown in dot-dash lines in two different positions, representing their respective positions for cooperation with annular bodies of different internal diameters;

Fig. 10 is a top plan view of the apparatus shown in Fig. 9 with certain of the valves and pipes of the hydraulic system for operating the hook omitted;

Fig. 11 is a fragmentary bottom view of the apparatus shown in Fig. 9 with the lower or movable plate or member and the pipes for the operating cylinders removed and with certain parts shown in section, the view illustrating the relationship of the parts of the actuating mechanism for effecting movement of said lower member or plate of the hook;

Fig. 12 is an end view of the mechanism shown in Figs. 9 and 10 as seen from the left-hand side of those figures;

Fig. 13 is a sectional view taken substantially on the line 13—13 of Fig. 9 and looking in the direction indicated by the arrows;

Fig. 14 is a fragmentary sectional view taken substantially on the line 14—14 of Fig. 9 and looking in the direction indicated by the arrows;

Fig. 15 is a fragmentary sectional view taken substantially on the line 15—15 of Fig. 9 and looking in the direction indicated by the arrows so that the interconnected parts appear in substantially their "opened-out" or operated positions;

Fig. 16 is an enlarged end view of a portion of the lower rear portion of the hook, with parts broken away and others in section, to further show the connections for the hydraulic system of the hook;

Fig. 17 is a perspective, somewhat schematic view of the reeving of the cables for operating the hook, a portion of the hook being indicated in broken lines to show its relationship to the various sheaves;

Fig. 18 is a simplified schematic representation of the hydraulic system for operating the hook;

Fig. 19 is a simplified schematic wiring diagram of the control circuit for actuating the hydraulic system of the hook;

Fig. 20 is a longitudinal sectional view of a modified form of material handling hook; and, Fig. 21 is a bottom view of the modified hook shown in Fig. 20, with the lower movable portion of the expanding leg or member removed and with parts broken away and others shown in section to more clearly illustrate the operating mechanism.

Referring first to Figs. 1 through 4 of the drawings, it will be seen that, in accordance with one embodiment of the invention, annular bodies, such as coils C of wire, rod, or the like, are arranged in vertical piles within a storage area or warehouse W, the axes of the coils in any one pile extending in substantial vertical alignment so that the central openings therethrough are substantially aligned. The coils in any given vertical pile are preferably all of the same characteristics, that is to say, they have the same chemical and physical characteristics and are substantially of the same size, the piles being arranged in a symmetrical pattern or patterns, as will be apparent from Fig. 2, so as to leave a minimum of waste space therebetween. Lateral displacement of the coils in any pile is prevented by vertically extending, elongated, rigid members 25, which are located in the interstices between the respective piles and held from lateral movement, as is hereinafter more fully described.

Annular bodies, such as the coils C, are transported to and from storage in the vertical piles aforementioned by a material handling apparatus, generally designated 26, supported for movement above the piles of coils or the like and including a substantially U-shaped member or hook, generally designated 27, which is adapted to be raised, lowered, and tilted as well as being movable to different positions above the coils. This substantially U-shaped member or hook has one leg 28 thereof adapted to be inserted through the central openings of the coils handled and so constructed as to be laterally expansible, after insertion, to effect engagement with spaced portions of the said central openings of the coils C to thereby retain the coils thereon when the U-shaped member is tilted. In addition, this leg 28 of the hook or U-shaped member is preferably provided with retractable projections adapted to extend in front of the forwardmost coil upon the hook, or between convolutions of the forwardmost coil when the material is helically or spirally coiled, to prevent displacement of the coils from the hook. The details of construction providing the above-mentioned functions are hereinafter described in detail. It is sufficient for the present, however, to note that, with an apparatus having the characteristics mentioned, annular bodies such as coiled material are handled by the hook 27 by laterally contracting the leg 28 thereof, moving the hook to insert this leg within the central opening or openings of the bodies to be handled and then expanding the leg 28 and extending the projections thereon to firmly retain coils thus positioned upon the hook. The hook with the coils thereon is then moved to the point where the coils are to be deposited whereupon the leg 28 and the projections are contracted so that the hook may be freely withdrawn from the bodies.

As an illustration, let it be assumed that the apparatus is employed to effect storage and handling of coils C of wire in accordance with the method of this invention. Let it further be assumed that the coils C of wire are lying with their axes substantially horizontal and that it is desired to place them in storage with their axes extending substantially vertical. The material handling means 26, including the hook 27, is moved to a point adjacent the coils, which may be in a railroad car or the like, and the hook 27 is then lowered until the expansible leg 28 is substantially aligned with the central openings in the coils, if necessary the hook being tilted up or down to effect this alignment. The hook is then advanced to insert the expansible portion or leg within the central openings of the desired number of coils C to be transported at a given time. The hook may then be lifted sufficiently so that the coils are supported solely thereby whereupon this portion of the hook member is expanded and the projections, if employed, are extended to engage the outermost coil supported on the leg 28. The hook is then elevated sufficiently to clear all obstacles and preferably to its upper limit so as to be positioned substantially as shown in full lines at the left in Fig. 1. The handling apparatus and hook are then moved overhead to a point above the desired place of storage. The hook is then tilted to dispose the axes of the coils substantially vertical. The coils will not fall from the hook when thus positioned due to the manner in which they are held thereon. The hook is next lowered to place the coils C thereon between the desired vertically extending members 25, and, when the outermost coil on the hook is substantially in engagement with the top coil of the pile, or with the lower supporting surface for the coils if a new pile is being started, the leg 28 of the hook is contracted, thus releasing the coils so that the hook may be freely elevated, leaving the coils in place. The operation is then repeated, coils of different characteristics being placed in separate piles. By reversing these operations the coils may be removed from storage and transported to a desired location where the coils may be deposited with their axes extending either horizontally or vertically as may be needed or desired. The coils may be transported from one pile to another within the warehouse or storage space W, if desired, by suitable raising, lowering and/or tilting of the hook, the expansible leg of the hook being selectively expanded and contracted to retain the coils thereon and to permit release therefrom, respectively.

As previously mentioned this means and method of storing annular bodies, such as coiled material, provides for full selectivity, since bodies of like characteristics are readily accessible without the necessity of moving bodies of other characteristics. This full selectivity, moreover, is not obtained as a result of any sacrifice of storage area, but, on the contrary, is achieved with a more efficient utilization of the area and with greater loads per square foot, which is the usual measure of economy in storage facilities. Furthermore, when coils of wire and the like are stored in this manner, the height of the individual piles thereof is limited substantially only by the height of the available storage area, since the weight of the material in a pile does not deform the lower coils, as is the case when coils are stored with their axes disposed horizontally. In addition, the storage area may be utilized to its maximum extent since no aisles or passageways need be left therein for the use of handling apparatus, as is necessary when the material is stored with their axes substantially horizontal. Finally, less supporting framework is necessary to prevent displacement of the piles than in the case where the material is stored with the axes of the coils horizontal. The supporting means also requires less fabrication and does not utilize valuable storage space since it is located in the interstices between adjacent piles.

Figure 2:
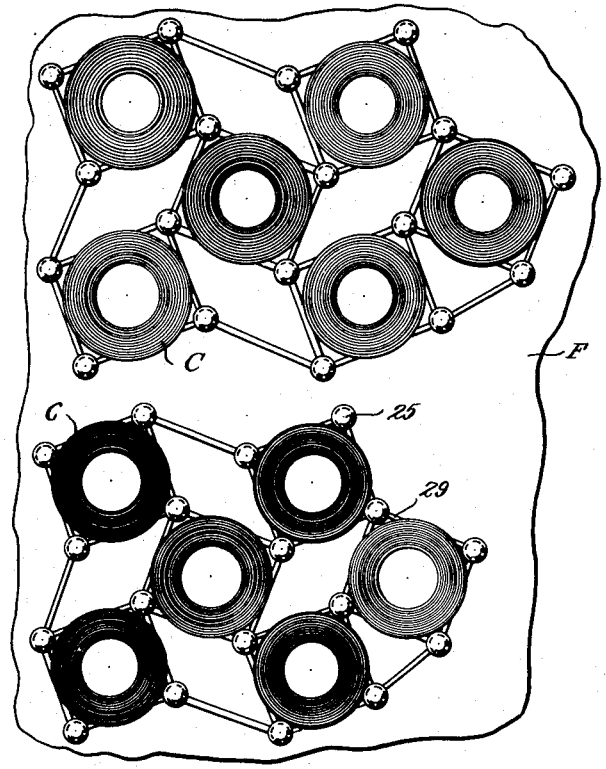
Fig. 2 is a top plan view of a portion of the supporting structure or framework shown in Fig. 1 with annular bodies, such as coils of wire, supported thereon.
Figure 4:
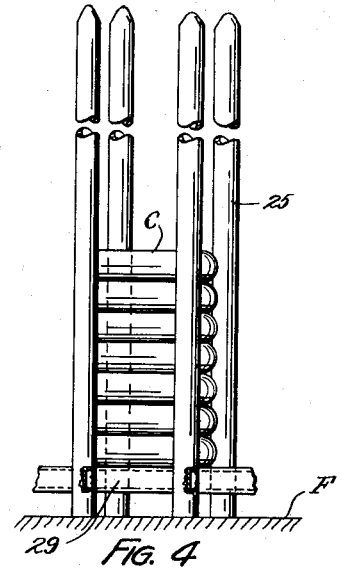
Fig. 4 is a fragmentary view, partly in side elevation and partly in section showing one set of vertical and horizontal supports of the type shown in Figs. 1–3 forming a part of a framework for supporting annular bodies in accordance with this invention.
Figure 3:
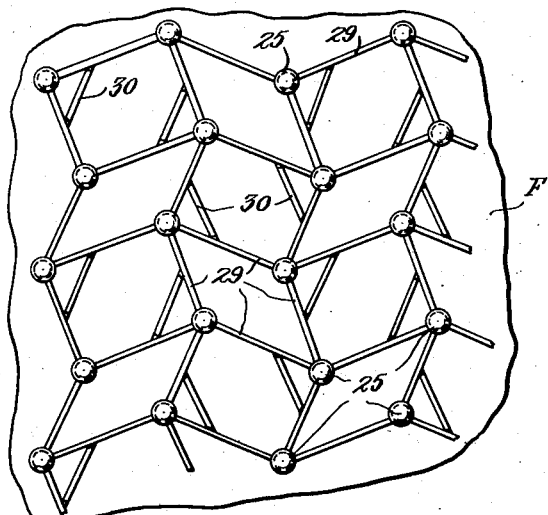
Fig. 3 is a top plan view of a portion of the supporting framework shown in Fig. 2 with the annular bodies removed therefrom.

One type of supporting framework, which may be utilized in a storage area for effecting storage of annular bodies as just mentioned, is illustrated in Figs. 1–4, the details being shown particularly in Figs. 2, 3 and 4. As shown therein, the framework comprises a plurality of rigid, elongated members 25 which may be steel pipes or the like provided with conical caps. These members 25 are arranged in vertically extending, symmetrical order so as to form the corners of regular polygons and are joined together adjacent their bases by horizontally extending members 29. These horizontal members may be formed of suitable structural steel members such as I beams, channel members, or the like, and are preferably secured to the vertical members or pipes 25 by welding. It will be observed that these members 29 constitute sides for the polygon of which the vertical members 25 form corners and the greatest transverse dimension of the polygons, as measured to the inside edges of the members 29, is preferably less than the outside diameter of the coils C to be supported thereby, while the least transverse dimension across said polygons is equal to or greater than the central openings through the coils C. The upper surfaces of the several members 29 preferably lie in a substantially horizontal plane and these members preferably are the sole means interconnecting the pipes or vertical members 25, the lower ends of which may simply rest upon the floor F of the storage area or warehouse W without the necessity of being secured thereto. In addition to securing the vertical members 25 together, the horizontal members 29 perform the additional function of supporting the lowermost coil C in each of the several piles in positions elevated above floor F of the storage area. This enables the outer end of the expansible portion 28 of the handling mechanism to extend below the lowermost coil C a sufficient distance so that the previously mentioned laterally extending projections may engage below and be retracted from beneath the said lowermost coil, thus facilitating withdrawing the coils from storage and enabling the placing of such coils by lowering the latter directly upon a supporting surface without the necessity of dropping the coils.

A segment of a storage area provided with a framework of the type just described with coils C positioned therein, is shown in Fig. 2, and it will be observed that the storage area may be provided with a plurality of separate frameworks comprising polygons of different sizes when the dimensions of the coils to be stored vary, coils of a given size being stored in one framework while those of a materially different size are stored in a different framework. Instead of employing separate frameworks, the polygons of the same or different sizes may all be interconnected in one framework dependent upon the characteristics of the storage area and the type of bodies usually placed therein. It will be apparent that with the type of framework shown, the piles of coils C are retained from lateral displacement without obstruction of their central openings so that a material handling means such as the hook 27 may be freely utilized therewith by insertion of the expansible portion 28 thereof through the central openings, the spacing between the coils being sufficient to accommodate the other leg of the hook, as is evident from the broken line position of the latter in Fig. 1. A portion of a supporting framework of the type just mentioned without any coils therein is shown in Fig. 3. As will be observed from this figure, the adjacent horizontally extending members 29 for any given polygon may be reinforced by diagonal braces, such as 30, which are so placed that the least dimension in a horizontal direction therebetween is equal to or greater than the diameter of the central opening through the coils C to be supported thereon.

Figure 6:
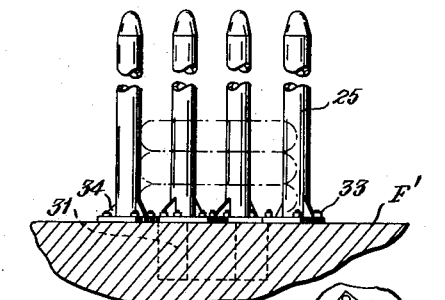
Fig. 6 is a fragmentary detached view, partly in section and partly in side elevation, showing one unit of the modified form of supporting means illustrated in Fig. 5, the position of the annular bodies being indicated in dot-dash lines.
Figure 5:
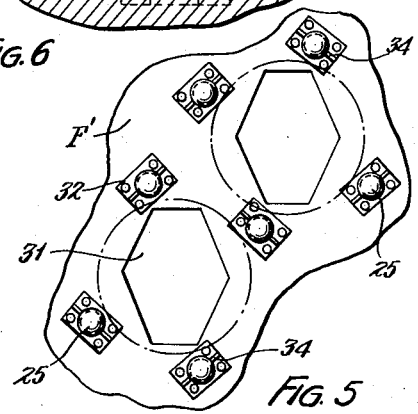
Fig. 5 is a fragmentary top plan view of a storage area showing the floor thereof and an annular body supporting means constructed in accordance with this invention and representing a modification of the supporting means shown in Figs. 1–4, the positions of the annular bodies being indicated by dot-dash lines.

A modified form of framework or supporting means which may also be utilized for storing annular bodies, such as coiled material, in the manner substantially as heretofore described, is shown in Figs. 5 and 6. As shown in these figures, the floor F' of the storage area is provided with spaced wells or recesses 31 which may be circular or polygonally shaped, the latter being illustrated. The spacing of these wells or recesses corresponds with the spacing of the piles of coil or coils to be supported so that the wells or recesses are arranged in a symmetrical pattern, the least transverse dimension of each well or recess being preferably equal to or greater than the inside diameter of the coil or coils to be supported thereabove. The wells 31 are provided for the purpose of enabling the lower end of the expanding leg 28 of the material handling hook 27 to extend therein when coils are being placed or removed from storage. This enables the previously mentioned laterally extending projections to be positioned below the lowermost surface of the lowest coil in a pile when the latter is being removed from storage and likewise allows the lowermost coil of a series of bodies being placed in storage to be supported upon the storage surface before the hook is released therefrom, thereby eliminating impacts due to dropping of the bodies from the hook.

Lateral displacement of piles of coils or other annular bodies disposed in a storage area provided with recesses, such as 31, is prevented by elongated rigid members 25 substantially identical with those bearing similar reference numerals and illustrated in Figs. 1 to 4. In this case, however, the vertical members 25, which are arranged in polygonal configuration about the wells 31, are not interconnected by horizontal members 29, but instead the lower ends of the members 25 are preferably secured to the floor F'. As illustrated, this is effected by employing base plates 32 which are secured to the floor by suitable anchor bolts 33 and to the lower ends of the pipes 25 by welding or the like, diagonal reinforcing braces 34 being preferably provided between the base plates 32 and the adjacent sides of the members 25 as will be apparent in Fig. 6. The method of handling and storing annular bodies is the same whether the bodies be supported by a framework such as disclosed in Figs. 1 to 4 or by the means shown in Figs. 5 and 6 and hence need not be here repeated.

The details of the material handling apparatus 26 will now be described with particular reference to Figs. 1 and 7 through 19. As shown, particularly in Figs. 1 and 7, the material handling device 26 is incorporated in a monorail carrier supported for overhead movement by an overhead monorail track system comprising a monorail crane or bridge supported by, and movable along, a runway comprising a plurality of spaced parallel longitudinally extending rails 35 suspended by suitable hangers 36 from the roof truss supports, not shown, of the warehouse or storage area W. The rails 35 are of conventional construction and have parallel track surfaces on either sides of central vertical webs which track surfaces support flanged wheels 37 and 38. The wheels, 37 and 38, are rotatably mounted on suitable bracket members 39 and 40 which in turn support the crane bridge or girder formed of a substantially I-beam shaped member 41, which is formed substantially like the rails 35, and has upper track surfaces on either side of a vertically extending central web on which surfaces roll or travel flanged wheels, such as 42 and 43 connected to carrier members 44 and 44'. It will be observed that the rails 35 extend at right angles with respect to the rail 41 and, since the latter is movable along the former while the carrier members 44 and 44', which support the carrier proper, are movable along the rail 41, the carrier may be horizontally moved to any position above the storage area.

The parts just mentioned are of the conventional construction employed in transfer bridges, overhead cranes or the like, and hence the details thereof need not be described. Suffice it to note that the rail 41 may be moved by suitable means, such as motor driven mechanism associated with one or more of the wheels 37, 38 while the carrier proper is driven by independent motors 45 carried by the carrier members 44, 44' and connected to the wheels 42, 43 through suitable gear trains within the housings 46. Power for operating the motors 45 and other parts of the apparatus hereinafter described is obtained from two overhead conductors 47, one on either side of the rail 41, by a suitable trolley member in the form of a small carrier 48 running upon the rail 41. The trolley member 48 includes current collector wheels in engagement with the conductors 47 and is connected with the carrier members, such as 44, by a flexible connection 49 so that any vibration, swaying movement or the like, of the carrier proper is not transmitted to the trolley member 48 thereby insuring satisfactory electrical contact with the conductor members 47 at all times.

Figure 7:
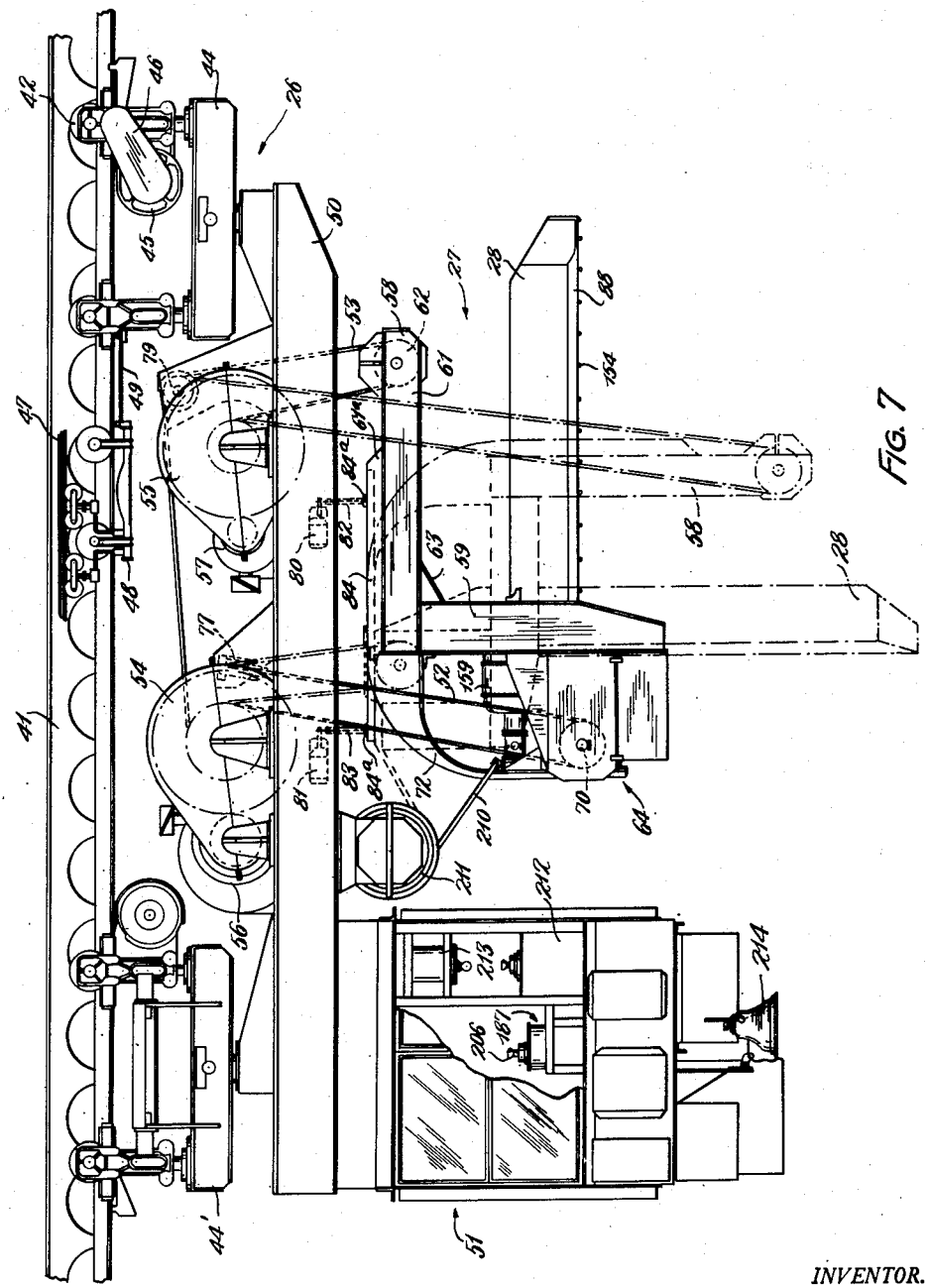
Fig. 7 is an enlarged side elevational view of the novel material handling apparatus shown in Fig. 1 illustrating the manner in which it is supported for overhead movement, the inverted or vertical position of the material handling member or hook being indicated in broken lines.
Figure 8:
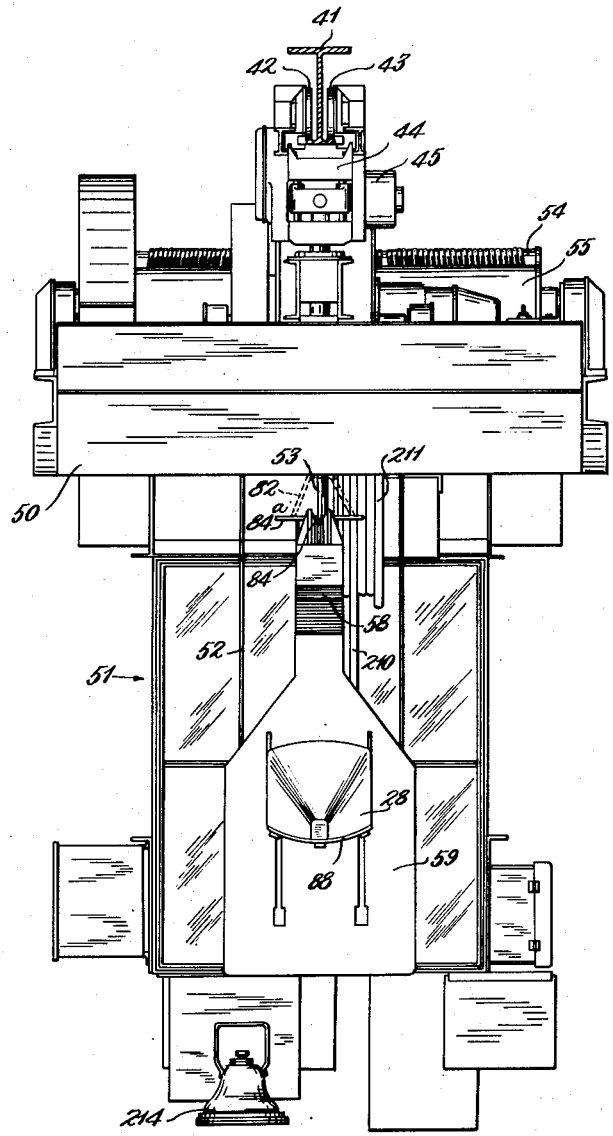
Fig. 8 is a front view of the apparatus shown in Fig. 7.

The members 44 and 44' of the carrier are interconnected by a suitable supporting frame 50 from one end of which is suspended an operator's cab 51. The material handling hook 27 is supported from the member 50 forwardly of the cab 51, that is to the right as shown in Figs. 1 and 7 by cables 52 and 53. This is effected by a pair of spaced cable drums or reels 54 and 55 which are rotatably supported upon the member 50 and driven by separate drive motors 56 and 57, respectively, through suitable gearing. The cables 52, 53 are connected with the drums and reeved about pulleys upon the hook 27, as hereinafter described.

The material handling member or hook 27 is, as previously mentioned, substantially U-shaped and therefore comprises, in addition to the expanding leg 28, a non-expanding leg 58, the two legs being connected together by a normally vertically extending portion 59. The upper leg 58 is constructed of suitable structural members, such as channel members or the like 60, 61, see Fig. 10, connected together in spaced relationship to provide a longitudinally extending opening therebetween. A pulley or sheave 62 is rotatably supported by the members 60, 61 adjacent the forward end of the space therebetween, which sheave receives the previously-mentioned cable 53. The members 60 and 61 are connected at the rear ends to the normally vertical portion 59 of the hook which is fabricated from suitable structural members and is preferably wider than the legs 28 and 58 as will be apparent from Fig. 10. Preferably a diagonal reinforcing or bracing member 63 is provided between the members 60 and 61 and the adjacent face of the portion 59.

The portion 59 of the hook is provided with a rearwardly extending portion, generally designated 64, on the opposite side of the vertical portion 59 from that provided by the legs 28 and 58. This rearwardly directed portion 64 provides a support for the operating mechanism which effects expansion of the leg 28, as hereinafter described, and, in addition, the portion 64 is provided with spaced vertical supporting plates or brackets 65, 66, 67 and 68 adjacent either longitudinal side thereof. Between the plates or brackets 65, 66 is rotatably journalled a pulley or sheave 69 and a similar pulley or sheave 70 is journalled between the plates 67, 68. The several plates 65, 66, 67 and 68 are provided with guide members such as 71 adjacent the peripheries of the sheaves, which guide members are substantially triangular in cross section and serve to guide the supporting cables into the sheaves and prevent their entrance between the latter and the supporting plates. Similar guide members or plates are provided for the sheave 62. An arcuate member 72 is connected to the outer end of portion 64 and to the portion 59 adjacent the upper end of the latter to ensure proper operation of limit switches controlling the hoisting of the hook when the latter is tilted, as hereinafter described. The member 72 also serves as a guard or bumper to protect the operating mechanism upon the portion 64 of the hook.

The reeving of the supporting cables for the hook about the various sheaves and drums will be apparent from the diagrammatic representation in Fig. 17. As shown therein, the drum 54 is provided with three separate scored or grooved portions 73, 74, 75, while the drum 55 is provided with a single centrally located scored or grooved portion 76. The cable 52 has one end thereof connected to the drum 54 and the adjacent portion of the cable then is wrapped a plurality of times around the scored portion 73 of the drum 54. This cable then passes downwardly and around the sheave 70 of the hook, thence upwardly and about a direction changing pulley or sheave 77 rotatably mounted upon the support 50 with its axis substantially at right angles to that of the pulley or sheave 70. Cable 52 then passes over a second direction changing pulley or sheave 78, whose axis is substantially parallel with that of the pulley or sheave 77, and thereafter passes downwardly and about the sheave 69 after which cable 52 passes upwardly and over the scored portion 75 of drum 54 a plurality of times, the end of the cable being secured to the drum. One end of the cable 53 is also secured to the drum 54 and this cable, after passing a plurality of times around the drum 54, is then directed over a direction changing pulley or sheave 79, whose axis is substantially parallel with that of drum 54, after which the cable extends downwardly and about the sheave 62, thence upwardly and about the scored portion 76 of the drum 55, the end of the cable being secured thereto.

The construction just described is such that when the main hoist motor 56 is energized to rotate the drum 54 in a clockwise direction, the motor 57 not then being energized, the cables 52 and 53 are payed off the drum 54 at the same rate so that the hook 27 is lowered while maintained substantially horizontal. Conversely, energization of the motor 56 in the reverse direction elevates the hook 27 while the latter is maintained substantially horizontally. Tilting of the hook 27 may be effected by energization of the motor 57. Thus, energization of the motor 57 in a direction producing clockwise rotation of the drum 55 pays out the cable 53, thereby allowing the forward end of the hook to tilt downwardly. Conversely, energization of the motor 57 in the opposite direction raises the forward end of the hook. When the hook has been tilted to any desired position, it may be raised or lowered, while retained in this tilted position, by simply rotating the motor 56 while maintaining the motor 57 stationary. If desired, tilting, combined with a raising or lowering operation, may be effected by simultaneous energization of the motors 56 and 57. It will be apparent, therefore, that the hook 27 may be raised or lowered and tilted to any desired position, including the vertical, which is indicated in broken lines in Figs. 1 and 7. Operation of the motor 57 to lower the forward end thereof is preferably combined with rotation of the motor 56 to raise the rear end of the hook when it is desired to move the hook from a horizontal to a vertical position in a minimum of space, as, for example, in a warehouse where the headroom over the piles and/or the vertical members 25 is only slightly greater than the distance from the bottom of the cab to the top of the pile or piles.

In order to limit the upward distance of movement of the hook with respect to the support 50, limit switches are provided in the circuits for the motors 56 and 57. These switches 80 and 81 are provided upon the support member 50 intermediate the sides of the latter (see Fig. 7) and the operating arms of the switches are connected by flexible members such as chains 82, 83, with a substantially horizontally extending member. This member comprises a longitudinally extending bar 84 adapted to freely fit between two parallel plate members 60a and 61a which extend upwardly from the members 60 and 61, respectively, the plate members 60a and 61a being substantially aligned with outwardly extending plates or flanges 72a and 72b on the arcuate member 72 (see Fig. 12). The bar 84 is provided with a plurality of transverse bars 84a which are adapted to rest upon the upper edges of the plates 60a, 61a or 72a, 72b when the hook is in its uppermost position as indicated in Fig. 7, the chains 82 and 83 being preferably connected to the bars 84a and 84b. The switches 80, 81 are of the type having contacts which are normally urged to open position but which are retained in closed position by a force applied to their actuating arms. Consequently, when the highest point of the material handling hook 27, which may either be the leg 58 or the arcuate support 72, is disposed sufficiently below the bars 84 and 84a so that the weight thereof is supported by the chains 82, 83, the switches 80, 81 have their contacts in closed position permitting energization of the motors 56 and 57. If, however, the hook 27 should be raised to a point such that it engages and lifts the bars 84 and 84a, the removal of the weight thereof from the switch actuating arms causes either or both the said switches 80, 81 to open the contacts thereof, thus automatically terminating further upward movement of the hook until the latter has been removed from engagement with the bars. The curve of the arcuate portion 72 enables the hook to be tilted when elevated without improper operation of the limit switches.

As mentioned heretofore, the lower leg 28 of the hook is laterally expansible and, for this purpose is preferably formed as two separate interconnected parts, the line of division extending substantially longitudinally of the leg. In the form of the device shown in the drawings, this lower leg is formed by a substantially rectangular hollow portion 85 rigidly connected with the vertical portion 59 of the hook, this hollow portion 85 being formed by suitable longitudinally extending plates strengthened by transversely extending plates such as 86 and 87, the forward end tapering to a somewhat blunt point. The lower portion of this leg of the hook member is formed by a substantially plate-like member 88 which is mounted for movement laterally with respect to the portion 85 as indicated by the broken line positions thereof shown in Fig. 9. This portion of the hook is preferably strengthened by longitudinally extending members 89 which terminate short of the tapering forward end corresponding with the point of the portion 85. The portion of tapering width of the plate 88 is preferably provided with strengthening ribs 90.

Movement of the plate 88 relative to the portion 85 is effected, in the form of the device shown in Figs. 7-19, by fluid pressure operated means. This is accomplished by providing a fluid pressure cylinder 91 within the hollow portion 85 of the leg 28, the rear end of this cylinder being pivotally supported upon suitable brackets 92 connected with the top of the portion 85. Slidably disposed within the cylinder 91 is a piston 93, see Fig. 18, to which is connected a piston rod 94. The piston rod extends exteriorly of the forward end of the cylinder and the outer end thereof is pivoted to a rod 95. The ends of the rod 95 are received in suitable apertures in the outer ends of longitudinally extending bars 96 and 97 and are pinned thereto. The rear ends of these bars are connected to a transverse plate 98 which is in turn connected to the forward ends of longitudinally extending bars 99 and 100. The rear ends of the bars 99 and 100 are each pivotally supported at 101 upon suitable brackets in the portion 64 which is carried by the vertical portion 59 of the hook. Intermediate the outer ends of the bars 96, 97 and of the piston rod 94, the rod 95 has the outer ends of links 102 and 103 pivoted thereon. The other ends of these links are pivoted on a rod 104 supported in brackets 105 and 106 mounted upon the plate 88. Adjacent the pivot rod 104, the brackets 105 and 106 have elongated vertically extending slots, such as 107, in which is disposed a transversely extending pin 108 carried by the links 102 and 103. The cylinder 91 is provided with fluid inlet and outlet conduits 109 and 110, on either side of the piston and adjacent either end of the cylinder, which are connected, as hereinafter described, to a source of fluid under pressure.

In order that the plate 88 will be maintained substantially parallel with the portion 85 during the relative movement therebetween, the forward part of the plate 88 is pivotally connected with the portion 85 in substantially the same manner as that just described for the rear part of this plate. That is to say, a pair of longitudinally extending bars 111 and 112 are respectively pivoted to brackets 113 and 114 which are secured to the side walls of the portion 85 adjacent the lower edge of the latter and spaced slightly forwardly of the transverse plate 98. The forward ends of the bars 111 and 112 are joined together by a transversely extending plate or member 115 to which are connected spaced longitudinally extending bars 116 and 117, the forward ends of which are connected to a pivot rod or shaft 118. Pivoted to substantially the middle portion of the rod or shaft 118 is a lower end of a piston rod 119, the inner end of which extends into a fluid pressure cylinder 120. The rear end of this cylinder is pivotally supported at 121 to brackets located substantially centrally of the upper portion 85 of the leg 28 and forwardly of the transverse rib 86 thereof. The piston rod 119 is provided interiorly of the cylinder 120 with a piston 122 and the cylinder is provided with fluid pressure inlet and exhaust connections 123 and 124 disposed on opposite sides of the piston 122, see Fig. 18.

Pivotally supported on the pivot shaft 118 are the outer ends of spaced links 125 and 126. These links are positioned on the shaft 118 intermediate the ends of the bars 116, 117 and the end of the piston rod 119. The rear ends of the links 125 and 126 are pivoted by a pin 127 supported in plates or bracket members 128 carried by and upstanding from plate 88. It will be seen therefore, that this construction is substantially similar to that just described as interconnecting piston rod 94 with the rear portion of the plate 88. The brackets 128 are likewise provided with elongated slots, such as 129, adjacent the pivot pin 127 and extending through these slots and carried by the links 125, 126 is a pin 130, this pin and cooperating slots operating, as hereinafter described, to permit a slight longitudinal movement of plate 88 rearwardly of the hook proper, as viewed in Fig. 9, after the plate 88 has been moved to its fully expanded position corresponding with the internal diameter of a body in which the leg 28 of the hook member is positioned.

The construction just described is such that, with the parts in the positions shown in solid lines in Fig. 9, the application of fluid pressure to the conduits 109 and 123 and exhaust of the cylinders through the conduits 110 and 124, moves the pistons 93 and 122 forwardly, thereby moving the plate 88 relative to the portion 85, the motion continuing until the portions 85, 88 are firmly engaged with the interior of an annular body in which the leg of the member is positioned. During this movement, the plate 88 is maintained substantially parallel with the portion 85 and the pins 108 and 130 will normally occupy the uppermost ends of the slots, 107 and 129, in the brackets to which the links 102, 103 and 125, 126 are pivoted. When the plate 88 initially engages the inner periphery of the annular body or bodies into which the leg 28 has been inserted, the pins 108 and 130 will still be in the positions referred to, while the positions of the cylinders and connected parts will be substantially as indicated in the upper of either of the broken line positions shown in Fig. 9. Further application of fluid pressure to the cylinders 91 and 120, after engagement of the plate 88 with the interior of the annular body or bodies causes the plate 88 to move slightly rearwardly, that is, to the left as viewed in Fig. 9, so that the pins 108 and 130 then occupy the lower portions of the slots 107 and 129, the positions of the cylinders and connected links being as indicated by the lowermost broken line positions of either of the said broken line positions in Fig. 9 from which it will be seen that the links 102, 103 and 125, 126 are at that time substantially horizontal. This additional rearward movement, as provided by the pins 108 and 130 and the cooperating slots in the brackets 105, 106, 128 enables outward extension of finger-like projections at the end of the leg 28, as hereinafter described.

The two sets of broken line positions of parts shown in Fig. 9 represent two different positions of the plate 88 corresponding with two different internal diameters of annular bodies to be handled thereby. It will be understood, however, that these positions shown are not critical and that the hook may be employed with annular bodies of any size intermediate the extreme size represented by the lowermost dotted position of the plate 88 and the minimum size which is represented by substantially the full line position of the plate 88. Moreover, as will hereinafter appear, the pressure exerted upon the annular bodies by the hook is substantially the same regardless of the inner diameter of the bodies.

The firm engagement of the portion 85 and the plate 88 with spaced portions of the interior of the coils or other annular bodies handled, as a result of the above-mentioned expansion or movement of the plate 88 relative to the member 85, serves to very firmly hold the coils or other annular bodies upon this leg of the hook. However, where the hook is to be tilted to a substantially vertical position, it is desirable to provide a still more positive means for preventing displacement of the coils or other annular bodies over the end of the hook and for this purpose the expanding leg of the hook is preferably provided with finger-like projections which are adapted to be moved transversely outwardly with respect to the leg in timed relationship with the expanding action thereof.

In the form of the apparatus shown in Figs. 7-19 of the drawings, the links 125, 126 have their forward ends provided with transversely extending projections or finger-like portions 131 which, in the contracted position of the leg 28, are normally disposed completely therein, these finger-like projections likewise remaining inwardly of the plate 88 when the latter is being moved or expanded into engagement with annular bodies in which the leg 28 has been inserted until after the plate 88 has engaged the side walls of the openings in such bodies. After such engagement, however, the continued application of fluid pressure to the cylinders 91 and 120 results in a slight longitudinal movement of the plate 88 rearwardly as viewed in Fig. 9 which, as previously mentioned, is permitted by the elongated slots 107, 129 and the cooperating pins 108 and 130. This movement of the plate 88 disposes the links 125, 126 in substantial parallel relationship with the plate 88 so that the finger-like portions 131 then project outwardly or transversely with respect to the plate 88 through suitable openings such as 132 provided therein. Since the plate 88 is in engagement with the side walls of the openings in the annular bodies positioned thereon, this projection of the finger-like portions 131 beyond the plate 88 disposes the latter in overlying relationship with respect to the inner corner or edge of the outermost body on the leg 28 or, if the bodies supported thereon are coiled wire or rod and the outermost body overlies the openings 132, the projections 131 will be forced between strands of the coiled material. In either event the finger-like projections provide a positive means for preventing the annular bodies from sliding over the end of the hook when the latter is tilted, even though it may be moved to a vertical position as shown in the broken lines in Figs. 1 and 7.

To further prevent displacement of coils or other annular bodies over the end of the leg 28 when the latter is tilted, the upper portion 85 of this leg is likewise provided adjacent its end with finger-like members or projections which are adapted to be extended transversely outwardly therefrom when this leg has been fully expanded into engagement with the central openings in the annular bodies supported thereon. Thus, elongated members 133 and 134, having laterally extending finger-like projections such as 135 adjacent one end, are pivoted adjacent to the opposite ends to the portion 85 of the expanding leg at either side of the top interior of the latter, this pivoting being effected by means of suitable pins and brackets, such as 136. Operation of these members 133, 134 is effected by individual fluid pressure actuators comprising cylinders 137 and 138, each provided with a piston 139 and 140, respectively, and having fluid pressure connections 141, 142 and 143, 144 on either side of the said pistons, see Fig. 18. Connected with the pistons 139 and 140, respectively, are piston rods 145 and 146 which extend outwardly from the cylinders. The outer ends of the pisotn rods are provided with eye portions such as 147, see Fig. 15, and each eye portion is provided with a pivot pin, such as 148, the ends of the latter being received in the spaced arms of a yoke portion 149a provided on one end of a link 149. The other end of each link 149 is pivotally supported upon the adjacent side wall of the portion 85 of leg 28 by a bracket 150. Pivotally supported upon each pin 148, intermediate the eye portion 147 and the arms of the yoke 149a, are pairs of links 151, 152, the other ends of which are pivoted to the corresponding member 133, 134, respectively, by means of pivot pins such as 153.

The construction is such that the links 149, 151 and 152 constitute toggle linkages for operating the elongated members 133 and 134. Hence, when fluid pressure is supplid to the cylinders 137, 138 through the conduits 141, 143 the pistons 139 and 140 are moved outwardly, that is to the right as viewed in Fig. 18, thus causing the links 151, 152, to move the members 133, 134 from their full line positions as shown in Fig. 9 to their broken line positions as shown therein and, in the latter positions the finger-like projections 135 of the members 133, 134 extend outwardly from the portion 85 through suitable openings therein. Consequently, the projections 135 will act to retain coiled material and other annular bodies on the leg 28 of the hook in the same manner as described with respect to the finger-like projections 131, it being observed that the projections 131, 135 are so arranged that they engage the outermost body on the hook at substantially diametrically disposed points.

To further assist in preserving the proper positions of coils or other annular bodies supported on the expanding leg 28 of the hook, the lower surface of the plate 88 may be provided with spaced fixed projections 154 which, in the form shown, comprise transversely extending rods or bars welded to the lower surface of the plate at spaced points therealong, the spacing between the bars preferably corresponding to, or being greater than, the greatest axial length of annular bodies handled by the hook.

The mechanism for providing fluid pressure and controling its application to the cylinders 91, 120, 137 and 138 is caried by the hook 27 and is preferably located in the portion 64 of the hook provided at the rear of the vertical portion 59, see Figs. 9, 12 and 16. The construction and operation of this fluid pressure system can best be understood with reference to the diagrammatic representation thereof shown in Fig. 18 in which the parts bear the same reference numerals as the corresponding elements shown in Figs. 9, 12 and 16, illustrating an embodiment of the mechanism in a commercial form of apparatus. The fluid pressure system is preferably of the hydraulic type employing oil or other suitable fluid therein. Therefore, the system comprises a tank or reservoir 155 for the fluid which is withdrawn therefrom by action of a pump 156 connected with the tank 155 by a conduit 157, the end of the conduit 157 within the tank being provided with a strainer 158. The pump 156 is preferably operated by an electric motor 159 controlled as hereinafter described.

The output of the pump 156 is connected by a pipe or conduit 160 to a pressure relief valve 161 of conventional construction to which is connected a conduit 162 providing a return for the fluid to the reservoir 155 when the pressure of the fluid exceeds the predetermined value for which the valve 161 is set. Normally, however, the fluid is forced from the valve 161 through a conduit 163 to a double solenoid operated, spring return, valve, generally designated 164. This valve is of conventional construction and may be such as is manufactured by Vickers, Inc., of Detroit, Michigan, and known as DG-5S4-061-C and which is shown in drawing No. R-106911 published by that company for use in connection with sales and service of the valve, see also Bulletin 48-27 copyrighted in 1948 by Vickers, Inc. Such a valve is operated by two separate solenoids 165 and 166 which act alternately to direct the fluid under pressure from the conduit 163 to either the conduit 167 or conduit 168, the other of these conduits being then connected through the valve 164 to an exhaust conduit 169 providing a return to the tank or reservoir 155.

The conduit 167 is connected with a sequence and check valve 170 of common commercial form likewise manufactured by Vickers, Inc., the valve being of the type identified by their number RC-104-D2 and illustrated in their drawing No. E-38713, see also Bulletin 45-34 copyrighted in 1946 by Vickers, Inc. The valve 170 is provided with two outlet conduits 171 and 172, the conduit 171 being connected with the conduits 109 and 123 for the cylinders 91 and 120, while the conduit 172 is connected with the conduits 141 and 143 for the cylinders 137 and 138. This sequence valve is of the spring loaded type such that, when fluid pressure is supplied thereto, through conduit 167, the fluid under pressure is transmitted therethrough to the conduit 171 until the pressure therein exceeds a predetermined value whereupon pressure is also supplied to the conduit 172. The valve 170 includes a one-way check valve permitting free fluid flow in the opposite direction from both the conduits 171 and 172 to the conduit 167.

In addition to the previously mentioned conduits connected to the valve 164, the latter is also provided with a drain conduit 169a which permits draining of that portion of the fluid used to assist the solenoids in effecting valve movement. The valve 170 is also provided with a drain pipe 170a which is never in direct communication with the conduits 167, 171 or 172 but which is necessary to carry off any leakage about the movable portion of the valve. These drains, while necessary to proper operation of the valves, are conventional and their nature and purpose will be readily apparent from an inspection of the above mentioned bulletins of Vickers, Inc.

The conduit 168 is connected with a counterbalance valve of conventional construction, such as that sold by Vickers, Inc., and illustrated in Bulletin 45-34 copyrighted 1946 by Vickers, Inc., and identified by their number RC-104-D-1. The output of this valve 173 is connected to a conduit 174 which, in turn, is connected with the conduits 110 and 124 of cylinders 91 and 120, respectively, and the conduits 142 and 144 of the cylinders 137 and 138, respectively.

The counterbalance valve 173 is provided for the purpose of preventing excessively rapid exhaust of fluid pressure from in advance of the pistons such as 93, 122 and 139, 140 when the leg 28 is being expanded to thereby prevent shocks to the apparatus since, when the leg is in horizontal position, this exhaust would be assisted by the force of gravity exerted upon the plate 88 and the attached parts. The operation of the hydraulic system just described will be more fully apparent from the description as hereinafter set forth.

Control of the operation of motor 159 and of the solenoids 165, 166 to control the valve 164 is electrically effected as will be apparent from the simplified schematic circuit diagram shown in Fig. 19. As represented therein the motor 159 is of the direct current, compound wound, type and power is supplied for operation thereof and of the solenoids of valve 164 from direct current power supply lines L1, L2 which, it will be understood, are connected to the conductors 47 through suitable safety devices, switches and the like, not shown. The conductive path provided by one of the conductors 47 and the associated trolley wheel is represented in Fig. 19 by a connection 175 between the line L1 and one terminal of a collector ring and brush assembly 176, the circuit continuing to the armature 177 of the motor through wires 178, 179, the other terminal of the armature 177 being connected by a wire 180 to one side of a series field winding 181 for the motor. The other terminal of this field winding is connected by wire 182 to the collector ring and brush assembly 176, this circuit continuing through a wire 183 to a circuit breaker 184 and from thence through a wire 185 to a stationary terminal 186 of a multiple contact drum type controller or switch, generally designated 187. Connected with the wire 178 is a wire 188 which is also connected with one terminal of the shunt field winding 189 for the motor, the other terminal of this winding being connected by wire 190 to the collector ring and brush assembly 176 and then by a wire 191 to a stationary contact 192 of the switch 187. The contact 192 is bridged to a second stationary contact 193 of the switch 187 and the latter is connected with the power supply line L2 through the other trolley wheel and its associated conductor 47 which are, for simplicity, illustrated in Fig. 19 as being simply the wire L2 extending to the contact 193.

The power supply line L1 is connected by a wire 194 to a stationary contact 195 of the switch or controller 187 and adjacent to, but spaced above the contact 195 as viewed in Fig. 19, is another stationary contact 196 which is connected with yet another stationary contact 197 located below the contact 195. The contact 197 is connected by a wire 198 to corresponding terminals of the solenoids 165 and 166 for the valve 164. The other terminal of the coil 165 is connected by wire 199 to a stationary contact 200 of the circuit controller or switch 187, and the second terminal of the coil 166 is connected by a wire 201 to a stationary contact 202 of the switch or controller 187.

As schematically represented in Fig. 19, the switch or controller 187 is preferably of the drum type and is therefore preferably provided with two sets of conductive portions which may be in the form of strips of metal or the like carried by the insulated portion of the drum and constituting the movable contacts of the switch or controller. Thus, the drum is provided with conductive portions or strips 203, 204 and 205 which are mounted upon the drum in substantially axial alignment. The drum or movable portion of the controller 187 is adapted to be actuated by a handle which may be in the form of a crank 206 and in one position of the drum, as determined by operation of the crank 206, the contact 203 is adapted to engage and bridge the stationary contacts 195 and 197. In the same position of the drum the contact 204 will engage and bridge the contacts 186 and 193 and the contact 205 will engage and bridge the contacts 192 and 200. The movable portion or drum of the circuit controller is also provided with a second set of conductive portions or strips 207, 208 and 209 which are arranged in axial alignment upon the drum and spaced from the contacts 203, 204 and 205. The conductive segment 207 is adapted, in one position of the drum, to engage and bridge the stationary contacts 195, 196 and simultaneously the conductive segment 208 will be in engagement with stationary contacts 193 and 202, while the contact segment 209 will engage and bridge the stationary contacts 186 and 192. It will be readily apparent from Fig. 19 that, when the conductive portions 203, 204 and 205 are in engagement with the cooperating stationary contacts, the conductive segments 207, 208 and 209 will be moved from engagement with their cooperating stationary contacts. Consequently, only one of the solenoids 165, 166 can be operated at a given time and regardless of which solenoid is so operated, the motor 159 will be energized for rotation in but one direction.

As mentioned heretofore, the material handling apparatus is provided with a cab 51 for the operator, in which cab are positioned the various controls to operate the apparatus, including the drum controller 187 which controls the operation of the hydraulic system for expanding and contracting the leg 28 of the hook. Since the motor 159 and the solenoids 165, 166 for the valve 164 are carried by the hook and hence move relative to the cab 51, the various wires interconnecting the motor and the solenoids with the controller take the form of a multi-conductor cable 210 which is wound upon a take-up drum or reel 211 rotatably supported upon the members 50 which also support the cab 51. The several conductors of the cable 210 are connected to the wires 175, 183, 191, 198, 199 and 201 by suitable conventional means, as, for example, by having one end of each of the conductors of the cable connected with collector rings on the axis for the reel with which cooperate stationary brushes, this being indicated schematically by the broken line rectangle 176 in Fig. 19.

The cab 51 is likewise provided with a drum type controller 212 for effecting operation of the main hoist motor 56 and a similar controller, which does not appear in Fig. 7, since it is located behind the controller 212, is provided for regulating the operation of the auxiliary hoist motor 57. A controller 213 regulating the operation of the motor such as 45 for effecting travel of the carrier along the rail 41 is conveniently located in the cab 51, preferably in an inverted position above the controller 212, and a similar controller, not shown, is employed for effecting movement of the rail or bridge 41 along the rails 35. The cab 51 may also be provided with various auxiliary equipment useful in operation of the cab and which are conventionally supplied thereon such as, for example, one or more searchlights 214.

For the purpose of explanation of the operation of the device, let it be assumed that annular bodies, such as coils of wire, are to be transported from positions in which their axes extend substantially horizontally, for example, from a freight car, to storage in piles within the warehouse W in which piles the axes of the coils extend substantially vertically. In effecting such an operation, the operator positioned in the cab 51 will manipulate the travel controller 213 to control energization of the carrier motors 45 and thereby effect movement of the material handling mechanism 26 along the rail 41. A similar controller when manipulated controls energization of suitable motors to effect movement of the rail or bridge 41 and the handling mechanism along the rails 35, these operations being similar to conventional overhead monorail crane movements and hence need not be described in detail.

When the material handling mechanism 26 has thus been moved to a position above one end of a row of the coils, in a railroad car or the like, which coils are to be lifted and transported, the hoist controller 212 is actuated to thereby energize the main hoist motor 56 thus causing the hook 26 to move downwardly, while remaining substantially horizontal, due to the simultaneous paying off of the cable 52 from both ends of the drum 54 and a corresponding paying off of the cable 53 from the central portion of the drum 54. This lowering of the hook is continued until the leg 28 thereof is at substantially the same elevation as the axes of the coils to be handled and substantially aligned therewith. If the axes of the coils be not substantially horizontal, the forward end of the hook may be tilted, either upwardly or downwardly as may be necessary, by energization of the auxiliary hoist 57, which controls paying out or taking up of the cable 53 independently of the cable 52. The entire mechanism 26 may be moved, as above described, to effect alignment of the leg 28 of the hook with the central openings in the coils. When this alignment has been secured the hook 27 is moved forwardly, by energization of the travel motors 45, thus inserting the expansible leg 28 of the hook into the central openings of one or more of the coils.

After the leg 28 of the hook has been inserted within the coils, the hook is preferably raised slightly so as to cause the coils to be supported thereby and the handle 206 of the controller 187 is then actuated in a clockwise direction, as viewed in Fig. 19. This brings the movable conductive segments or strips 207, 208 and 209 into engagement with the stationary contacts 195, 196 and 193, 202 and 186, 192, respectively. Electrical energy is consequently supplied from L1 through the wire 194, contact 195, and conductive segment 207 to contact 196. Since the contact 196 is connected with the contact 197 and the latter is connected with the wire 198, current flows through this wire to one terminal of the solenoid 166 for the valve 164. The circuit is completed from the other terminal of the solenoid 166 through the wire 201, contact 202, and conductive portion 208 to the contact 193, which is connected with the power line L2. Since the contact 193 is also connected to the contact 192, engagement of the latter and the contact 186 by the conductive segment 209 establishes a circuit from L2 to the wire 185 and hence to one terminal of the circuit breaker 184. This latter circuit continues from the other side of the circuit breaker through the wire 183 to the series field coil 181 of the motor 159, and thence through the armature 177 of the motor and wires 178, 179 and 175 to the other power supply line L1. The shunt field winding 189 of the motor 159 is continuously energized, since it is directly connected across the lines L1 and L2, in parallel with the armature and series field winding of the motor, by wires 175, 178, 188, 190 and 191.

The operation of the controller 187 has therefore energized the motor 159 so that the pump 156 effects withdrawal of liquid from the tank or reservoir 155 and forces the liquid under pressure to the pressure relief valve 161 and from the latter to the valve 164. Since the solenoid 166 has been energized, the liquid under pressure is supplied through the valve 164 to the conduit 167 and thence to the valve 170 from which the liquid flows through the conduit 171 and conduits 109, 123 to the cylinders 91 and 120. These cylinders are drained, in advance of their pistons, through the conduits 110 and 124, which are connected to the conduit 174 and thence to the counterbalance valve 173, the valve 164 providing a drain or exhaust passage therethrough which provides intercommunication of the conduits 168 and 169.

The liquid under pressure thus supplied to the cylinders 91 and 120 moves the piston rods 94 and 119 outwardly, the rate of this movement being controlled by the adjustment of the counterbalance valve 173 which regulates the rate of drainage or exhaust of fluid pressure from in advance of the pistons in the cylinders. As the piston rods thus move outwardly, they operate through the linkages connected therewith to move the plate 88 of leg 28 laterally with respect to the portion 85 until these parts are in firm engagement with opposite portions of the central openings in the coils or other annular bodies supported on the expanding leg 28. At this time the pistons and the links such as 102, 103 and 125, 126 occupy positions corresponding with one set of broken line representations thereof in Fig. 9, the particular position of the plate 88 depending upon the internal diameter of the coils or annular bodies on the hook.

When the two parts of the leg 28 are thus positioned, the resistance to further lateral movement of plate 88 tends to cause the pressure of the liquid in the system to increase, thereby causing the sequence valve 170 to direct liquid under pressure to the conduit 172 and hence to the finger operating cylinders 137, 138. This increased pressure also produces a somewhat further movement of the piston rods 94, 119 of the actuators 91, 120. The application of fluid pressure to the cylinders 137, 138 through the conduits 141, 143 connected with the conduit 172, moves the finger members 133, 134 to cause the projections 135 thereon to extend outwardly relative to the upper surface of the portion 85 of the leg 28, it being noted that the cylinders 137, 138, in advance of their pistons 139, 140, are also connected to exhaust at this time through the counterbalance valve 173. The additional movement of the piston rods 94 and 119 does not produce any further lateral movement of the plate 88, but instead imparts a slight longitudinal movement thereto. This disposes the links 102, 103, 125 and 126 in the substantially horizontal positions indicated in the lower of either of the two broken line positions represented in Fig. 9, thereby causing the fingerlike projections 131 on the levers 125, 126 to extend outwardly and transverse with respect to the plate 88. Therefore, the coils in which the leg 28 of the hook is engaged are not only held by the force exerted at diametrically opposed points on the side walls of the central openings of the latter, but are also prevented from slipping over the free end of the hook in any tilted position of the latter by the fingers 131, 135, the extent of movement of these fingers being such that the distance from tip to tip when in their outer positions is considerably greater than the maximum internal diameter of the coils. It should be noted that the pressure exerted upon coils such as C, due to expansion of the hook, is substantially the same regardless of the internal diameters of the coils since the pressure applied to the cylinders 91 and 120 is substantially constant due to the operation of the pressure relief valve 161.

With the coils supported upon the expanded hook, the latter may be raised by operation of the hoist controllers, and the handling apparatus with the coils thereon transported, to a point where storage is to be effected, by operation of the controllers regulating energization of the motors for moving the carrier along the rail or bridge 41 and for movement of the latter along the runway or rails 35. During this movement the hook is preferably positioned in its uppermost location and the coils are held thereon substantially as shown at the left of Fig. 1. When the hook 27 is thus moved to a position above the space between sets of vertically extending members 25 defining one of the storage piles it is tilted to bring the leg 28 thereof substantially vertical by operation of the controller regulating energization of the auxiliary hoist motor 57, thereby lowering the forward end of the hook, and/or by energization of the controller 212 regulating the hoist motor 56, thereby raising the rear end of the hook. When the hook 27 has been moved so as to bring the axis of the coils and the leg 28 substantially vertical, the main hoist motor 56 is alone energized in the direction which effects paying off of the cables 52 and 53, thereby lowering the hook and coils to the position substantially as shown in broken lines in Fig. 1 from which it will be seen that the upper leg of the hook moves into the interstices between the piles while the lower leg of the hook enters the space between the vertical supports 25 defining one of the vertical piles.

With the hook and coils in the positions just mentioned, the controller 187 is operated in a counterclockwise direction to move the conductive segments 203, 204 and 205 into engagement with the corresponding stationary contacts. The conductive segments 207, 208 and 209 are then disposed out of engagement with the stationary contacts. This operation of the circuit controller completes a circuit from power line L1 through the wire 194 to contact 195, thence through conductive portion 203 to contact 197, the circuit continuing through the wire 198 to one terminal of the solenoid 165 of valve 164. The circuit is completed from the other terminal of the solenoid 165 through the wire 199, contact 200 and conductive segment 205 to contact 192 and hence to the line L2 since the contact 192 is bridged with the contact 193 and the latter is, in turn, connected with the power line L2. A circuit is also completed from the line L2 and contact 193 through the conductive segment 204 to the contact 186 and thence through the circuit breaker 186 to the series field winding 181, the circuit continuing through the armature 177 of the motor 159 and wire 175 to the line L1. The shunt field winding 189 remains energized since it is continuously connected with the lines L1 and L2 as previously described. It is evident, therefore, that the motor is energized for rotation in the same direction regardless of the direction of movement of the controller 187 but the direction of movement of the said controller determines which of the solenoids 165, 166 is energized.

The energization of the solenoid 165 now moves the valve 164 so that the liquid under pressure, supplied by the pump 156, is transmitted to the pipe or conduit 168 and thence through the counterbalance valve 173 and conduit 174 to the conduits 110, 124, 142 and 144 connected with the several hydraulic actuators or cylinders 91, 120, 137 and 138, respectively. At this time the conduits 109, 123, 141 and 143 of these several actuators or cylinders are connected to drain or exhaust to the sump or reservoir 155 through the conduits 171, 172, valve 170, conduit 167, and valve 164, which is positioned to provide a passageway therethrough communicating with the conduit 169 leading to the sump or reservoir 155. It will be apparent, therefore, that the several pistons within the cylinders are now moved in the reverse direction to that previously described thereby withdrawing the finger-like projections 131 and 135 inwardly of the expanding leg 28 of the hook, and the plate 88 is returned to its initial or unexpanded position so that the leg may now be freely withdrawn from the central openings of the coils C, leaving the latter in place in a vertical pile. The hook is manipulated to elevate it by reverse operations to those previously described and the sequence of operations may then be repeated for the storage of other coils.

In the operation of the device as just described, the drum controller 187 need not be left in one actuated position thereof so as to maintain the motor 159 in continuous operation for supplying liquid under pressure when the hook is in expanded position. This is due to the fact that the valve 164 is of the double-acting type, spring centered, and in neutral or central position connects the conduit 163 to the conduit 169 while blocking the conduits 167 and 168 from communication with either the conduit 163 or 169. Consequently, when the coil 166 has been energized to effect expansion of the hook and this expanding operation has been completed, the controller 187 may be returned to neutral position, that is, to the position as indicated in Fig. 19, at which time the motor 159 and the solenoid 166 will be deenergized. The valve 164 will return to its neutral or central position and the fluid pressure will be maintained within the cylinders.

Material in storage, as represented by the vertical piles between the upright members 25, may be readily removed therefrom by similar operations of the material handling apparatus. That is to say, the hook 27 is moved to a position over the pile of coils from which removal is to be effected. The hook is then tilted to bring its leg 28 to a substantially vertical position and the hook is then lowered with the leg in its contracted condition so that it enters the central openings of the coils. When thus positioned, the controller 187 is operated to expand the leg 28 of the hook and to force the finger-like projections 131, 135 outwardly with respect thereto. The coils will thus be firmly held upon the expanded leg of the hook and the latter may then be elevated, moved to a place where the coils are desired, and then lowered, the coils either being disposed in vertical order or horizontal as desired. After the coils have come to rest upon a supporting surface, the leg 28 of the hook may then be contracted and removed from the coils. In the event it should be desired to dispose the coils in a liquid bath without lowering the hook therein, the contraction of the hook may be effected before the coils come to rest upon a supporting surface so that the coils drop from the hook. When removing the coils from storage, the engagement of the finger-like projections 131, 135 beyond the outer surface of the lowermost coil in the pile is facilitated when the piles are so supported that the end of the leg 28 can project therebelow. This may be effected in a number of different manners of which two have been illustrated and described, namely by supporting the coils upon horizontally extending members, such as 29, spaced above the floor of the warehouse, or by providing wells, such as 31, of sufficient depth in the floor of the warehouse in alignment with the central openings of the piles of coils.

The hook portion of the material handling apparatus may be constructed otherwise than as shown in Figs. 7—17. For example, Figs. 20 and 21 illustrate a modified form of hook which may be employed in a substantially similar manner to that of the previously described form of the hook. In the instant embodiment, the upper leg of the hook is preferably formed as two elongated members 215, 216 extending substantially parallel and in spaced relation with respect to each other. These members 215 and 216 are interconnected adjacent corresponding ends thereof with an expanding leg, generally designated 217, which extends parallel with the leg members 215, 216 and spaced therefrom so as to lie in a different plane substantially intermediate the members 215 and 216. This hook when viewed from the side is substantially U-shaped and will be so termed.

In this form of the hook, the supporting cables are not reeved about sheaves upon the hook but rather terminate in suitable pivotal fasteners carried by the hook. Thus, the forward or free ends of the members 215, 216 have the cables 218, 219, respectively, connected thereto by means of suitable fasteners 220, 221 thereon, having annular end portions pivoted upon studs 222 and 223. The other ends of the cables 218, 219 are reeved about and connected to a suitable hoist drum such as that designated 55 in Fig. 7. The rear portion of this form of hook is provided with a yoke bar 224 which is pivoted for horizontal rocking movement upon the hook, the ends of this yoke bar being connected to pairs of cables, the ends of which are shown as secured to the yoke bar by fasteners 225 and 226, similar to the fasteners 220, 221, and retained upon the reduced ends of the yoke bar by means of studs 227 and 228. The cables thus connected to the yoke bar may be reeved about and connected to a hoist drum, such as 54, see Fig. 7.

The mechanism for moving the hook to different points within the storage area is constructed substantially as shown in Figs. 1 and 7 and comprises the supporting runway or rails 35, the bridge or rail 41, and the carrier including the hook member, support members 50 and cab 51. In the instant embodiment of the hook member, however, raising and lowering of the hook requires simultaneous operation of the hoist motors 56 and 57, since the cables are not reeved about sheaves on the hook. Tilting of the hook is effected by independent operation of either of the hoist motors 56, 57 or by simultaneous operation thereof in reverse directions.

In the form of the hook shown in Figs. 20 and 21, the expanding leg 217 is formed as two interconnected parts, the upper part or portion of which, 229, is hollow and contains the operating mechanism for moving the lower member or plate 230 relative to the portion 229. As before the member or plate 230 moves laterally relative to the portion 229 and these two parts are maintained substantially parallel throughout the movement by interconnected linkages. Movement of the plate 230 in the present embodiment is, however, effected by means of an electric motor 231 carried by that portion of the hook which unites the upper and lower legs. This motor 231 has its armature shaft provided with a pinion 232 which meshes with an idler gear 233 rotatably mounted upon the hook, the idler gear, in turn, meshing with a gear nut 234. The gear nut 234 is formed with an elongated hub having gear teeth on a portion thereof meshing with the gear 233, the central opening through the hub being threaded and cooperating, as a nut, with an elongated screw 235. The hub of the gear nut 234 has reduced diameter portions thereof journalled in suitable anti-friction bearings 236 and 237 supported between plates 238 and 239 so that the gear nut is rotatable but is held from axial displacement with the result that rotation of the nut causes the screw 235 to be moved longitudinally in a direction depending upon the direction of rotation of the motor 231.

The forward end of the screw 235 is connected to a crosshead 240 and the latter is slidably supported upon spaced parallel bars or rods 241 and 242 which are mounted upon suitable brackets adjacent the rear portion of the part 229 of the lower leg 217. Connected with the forward portion of the crosshead 240 and is an actuating rod 243 extending forwardly within the portion 229 of the leg 217 and connected with the rear portion of a crosshead 244, which is likewise slidably supported upon parallel extending rods or bars 245 and 246 supported by suitable brackets in the forward portion of the part 229 of leg 217. It will be apparent, therefore, that rotation of the motor 231 and consequent longitudinal movement of the screw 235 effects simultaneous longitudinal movement of the crossheads 240 and 244.

Elongated arms 247 and 248 each have one end pivoted at opposite sides of the crosshead 240 by pivot pins 249 and 250, respectively. The other end of the arm 247 is provided with a pivotal connection 251 to an elongated arm 252, the rear end of which is pivotally connected at 253 to the hook at a point adjacent the lower edge of the portion uniting the upper and lower legs thereof. The other end of the arm 248 is likewise pivotally connected at 254 to an elongated arm 255 extending parallel with the arm 252 but on the opposite side of the leg 217 therefrom, the rear end of the arm 255 being similarly pivotally connected at 256 to the portion of the hook uniting the upper and lower legs thereof. The forward ends of the arms 255 and 252 extend slightly beyond the pivotal connections 251 and 254 and adjacent their forward or outer ends the arms are pivotally connected at 257 and 258 to the outer ends of links 259, 260. The inner ends of these links are pivoted at 261 and 262 to suitable supporting brackets provided upon and upstanding from the lower movable plate 230. These brackets are provided with upwardly elongated slots, such as 263, adjacent the pivots 261 and 262 through which extends a pin or shaft 264 the ends of which are carried by the links or arms 261 and 262.

The forward crosshead 244 likewise has arms 265 and 266 pivoted thereto on opposite sides thereof, these arms extending forwardly therefrom and being pivoted adjacent their forward ends to elongated arms 267 and 268, the rear ends of the latter arms being pivoted at 269 and 270 to opposite sides of the portion 229 of the leg 217 and adjacent the lower edge of the latter. The forward portions of the arms 267 and 268 extend forwardly beyond the pivotal connections thereof with the arms 265 and 266 and the former are pivoted to links or arms 271 and 272, the rear ends of which are pivoted to suitable upstanding brackets carried by the plate 230. These arms or links 271 and 272 are likewise provided with a transversely extending pin 273, similar to the pin 264, and extending through elongated slots, such as 274, in the brackets providing the pivotal connections for the arms.

The forward ends of the arms 267 and 268 are provided with finger-like transversely extending projections such as 275 which are adapted to extend through suitable openings, such as 276, in the lower plate 230 after the leg has been fully expanded, as hereinafter described. Upper finger-like members are also provided for the expanding leg 217, these taking the form of transversely extending projections such as 277 provided on the outer ends of arms such as 278, the other ends of which arms are pivotally supported upon the interior upper surface of the portion 229 of the leg 217 in spaced relationship. The ends of the projections or fingers 277 are adapted to extend through openings 279 in the upper surface of the portion 229 of the expanding leg after the said leg has been fully expanded. Actuation of the fingers or projections 277 is effected by links such as 280 pivoted to the said finger members and to a crosshead 281 which is slidably disposed upon the parallel rods 245, 246 in advance of the cross slide 244 and connected for movement therewith by tie rods 282 and 283.

The operation of a material handling apparatus employing the modified form of hook shown in Figs. 20 and 21 is substantially the same as that previously described. That is to say, the hook is moved along the overhead supporting system, raised, lowered, and/or tilted by the operator in a cab manipulating suitable control switches for governing the operation of the motorized carrier and hoist drums. In the present form of the device, however, expansion and contraction of the hook is effected directly by operation of the single reversible electric motor 231 and does not employ the hydraulic system previously described for the form of the mechanism illustrated in Figs. 7 through 19.

The operation of the motor 231 is preferably governed by a simple reversing type switch enabling the operator to energize the motor for rotation in either direction, the circuit including the motor and such a switch may also include suitable protective devices, such as current overload relays or the like and/or limit switches to prevent overtravel of the crossheads, such as 240, 244 and 281. Since these several instrumentalities are well known, and the circuit connecting them would be simple in nature, it is deemed unnecessary to illustrate such a circuit. Suffice it to note that when the motor 231 is energized for rotation in one direction, it drives the pinion 232, idler 233 and the gear nut 234 thereby longitudinally moving the screw 235 and causing the crosshead 240 to move to the left, or outwardly, of the hook as viewed in Fig. 20. Since the crosshead 240 is connected by means of the rod or shaft 243 to the crosshead 244, the latter likewise moves at the same time. Movement of these crossheads acts through the arms or links 247, 248, 265 and 266 and the arms or links 259, 260, 271, 272 to effect lateral movement of the lower member plate 230 with respect to the upper portion 229 of the leg 217, the plate or member 230 being maintained substantially parallel with the portion 229 during this movement by means of the arms or links 252, 255, 267 and 268.

When the lower plate or member 230 has been expanded into engagement with the interior of a coil or other annular body supported upon the leg 217, an additional movement is imparted to the crossheads 240 and 244 thereby causing the arms such as 259, 260, 271 and 272 to assume a position substantially parallel with the lower member or plate 230 by causing the latter to shift backwardly, or to the right, slightly, as viewed in Figs. 20 and 21, this additional movement of the arms or links being permitted by the slots 263 and 274 and the cooperating pins 264 and 273 extending therethrough. This additional movement forces the finger-like portions 275 outwardly through the openings 276. Since the cross slide 281 is connected for movement with the cross slide 244, the upper finger-like members 277 will also have been fully projected exteriorly of the portion 229 at the completion of the forward movement of the crossheads, which movement may be terminated by the operator simply manipulating the control switch for the motor 231 or, preferably, by engagement of one of the crossheads with a limit switch or switches, not shown, but connected in the circuit for the motor 231. Retraction of the finger-like members 275, 277 and contraction of the leg 217 is effected by energizing the motor 231 for rotation in the reverse direction, thereby causing the crossheads 240, 244 and 281 to return to their initial positions illustrated in full lines in Fig. 20 and consequently returning the parts to the position shown.

The modified form of hook just described is therefore capable of handling coiled material or other annular bodies by insertion of the expanding leg 217 through the central openings of such bodies, this leg then being expanded and the finger-like projections extended so as to retain the annular bodies upon the hook when the latter is moved and/or tilted. Consequently, the hook may be employed for all the functions previously described, and in substantially the same manner, so that it is deemed unnecessary to further elaborate upon the operation of this form of the mechanism.

The above-detailed descriptions of the present preferred form and one embodiment of an apparatus for handling coiled material or other annular bodies represent examples of the manner in which the invention may be practically applied. It will be understood, however, that numerous modifications may be made in such an apparatus by one skilled in the art after having had the advantages of this disclosure and hence the illustrated and described apparatuses are not to be considered as a limitation upon the invention but only as examples thereof. For example, the hook may be supported from and moved by conventional means other than a crane or transfer bridge mechanism. Furthermore, while the herein disclosed methods may be very advantageously effected by the apparatuses illustrated and described, the methods are not restricted to use with the specific apparatuses disclosed but may be effected by other devices. Moreover, the invention while especially useful in handling and storing coiled material, such as wire, rod, or strip metal, is not limited thereto but may be employed to handle and store other annular bodies, such as gear blanks, tile, or the like.

Having thus described the invention, I claim:

1. In a material handling apparatus an elongated laterally expansible member, power operated means for effecting lateral expansion of said member to cause engagement thereof with spaced portions of an annular body in which the said member is inserted, movable elements supported by said member adjacent one end of the latter, means for moving said elements substantially transversely outwardly relative to said member in timed relationship with the expansion thereof, and control means remote from said laterally expansible member and operatively connected to said power operated means to govern the actuating thereof.

2. In a material handling apparatus an elongated laterally expansible member, power operated means for effecting lateral expansion of said member to cause engagement thereof with spaced portions of an annular body in which the said member is inserted, projection means adjacent one end of said member adapted to be selectively disposed within said member or to extend transversely outwardly from said member, means operatively connected to said power operated means for effecting movement of said projection means sequentially outwardly and inwardly of said member in timed relationship with respect to the expansion and contraction of said member, and control means remote from said laterally expansible member and operatively connected to said power operated means to govern the actuation thereof.

3. The combination as defined in claim 2 and in which the means for effecting movement of said projection means and the means for effecting expansion of said member each includes fluid pressure operated means carried by said member and valve means for sequentially applying fluid pressure to said fluid pressure operated means.

4. The combination as defined in claim 2 and in which the means for effecting movement of said projection means and the means for effecting expansion of said member comprises a single electric motor carried by said member and motion producing means actuated by said motor operatively interconnected with said movement effecting means and expansion means.

5. In a material handling apparatus an elongated member divided substantially longitudinally into two parts and adapted to be inserted as a unit into a central opening of an annular body, power operated means for producing relative lateral movement between said parts to effect engagement thereof with substantially diametrically opposed portions of the side wall of the central opening in the said annular body, movable means adjacent the end of at least one of said parts actuatable to and from a position extending transversely outwardly therefrom to prevent displacement of an annular body over the end of said member and means to actuate said movable means in timed relationship with the said lateral movement between said parts, and control means remote from said elongated member and operatively connected to said power operated means to govern the actuation thereof.

6. A material handling apparatus comprising a substantially U-shaped member one leg of which is adapted to be inserted in central openings of bodies to be handled, the said one leg comprising substantially parallel extending interconnected parts, power operated means interconnected with said parts for producing relative lateral movement therebetween and thereby engage said parts with spaced portions of the side walls of the central openings of the bodies in which the said one leg of the member has been inserted, means carried by said member adjacent the outer end of the latter and adapted to be moved to a position extending transversely outwardly from said leg to prevent displacement of bodies positioned thereon over the end thereof, and control means remote from said U-shaped member and operatively connected to said power operated means to govern the actuation thereof.

7. A material handling apparatus as defined in claim 6 and in which the said interconnected means and the said means adapted to extend transversely of said member include fluid pressure operated actuators, means carried by said member for sequentially applying fluid pressure to said actuators and means for controlling the direction of application of fluid pressure to said actuators.

8. A material handling apparatus comprising a substantially U-shaped member one leg of which is adapted to be inserted in central openings of bodies to be handled, the said one leg comprising substantially parallel extending interconnected parts, means interconnected with said parts for producing relative lateral movement therebetween to thereby engage said parts with spaced portions of the side walls of the central openings of the bodies in which the said one leg of the member has been inserted, finger-like members carried by said member adjacent the outer end of the latter and adapted to be moved to a position extending substantially transversely outwardly from said leg to prevent displacement of bodies positioned thereon over the end thereof, a reversible electric motor carried by said member, and means interconnecting said motor with the said means for producing relative movement between the parts of said member and the said finger-like members.

9. A material handling apparatus comprising a substantially U-shaped member one leg of which is adapted to be inserted in central openings of bodies to be handled, means supporting said member for overhead movement, power operated means for horizontally moving said member to various desired positions relative to said supporting means, power operated means for raising and lowering said member and manipulable for tilting said member relative to said supporting means into a vertically depending position, the said one leg of said member comprising substantially parallel extending interconnected parts, power operated means to produce relative transverse movement between said parts selectively towards and away from each other whereby the said parts may be disposed closely adjacent each other for insertion in the openings of bodies to be handled and thereafter laterally moved to effect engagement of the said parts with spaced portions of said openings in the said bodies to grip the latter and prevent displacement thereof relative to said member when the latter is moved to various positions, and separate operator actuated control means for each of said power operated means located at a station remote from said U-shaped member.

10. A material handling apparatus as defined in claim 9 and further comprising an operator's cab mounted upon said supporting means for overhead horizontal movement with said U-shaped member, with the said operator actuated control means in said cab for controlling therefrom the travel of said member, and said relative transverse movement between the parts of said member.

11. A material handling apparatus as defined in claim 9 in combination with a warehouse comprising a floor having vertical support members for supporting annular bodies with their axes vertical and arranged so that the stored bodies are accessible from above and so that at least part of the stored bodies are inaccessible to a worker on the floor level of the warehouse, said material handling apparatus being supported for movement above said vertical support members.

12. A material handling apparatus comprising an overhead substantially horizontally extending support, carrier means movable along said support, a plurality of cables depending from said carrier means, a substantially U-shaped member having one leg connected to said cables and the other leg adapted to be inserted in central openings of bodies to be handled, means on said carrier means for raising and lowering said cables to effect selective raising and lowering of said member and manipulable for tilting said member relative to said carrier means into a vertically depending position, the said other leg of the said member comprising substantially parallel extending interconnected parts, power operated means carried by said member for producing relative movement of said parts selectively towards and away from each other, and operator actuated control means for said power operated means at a location remote from said member, whereby the said parts of the member may be disposed closely adjacent each other for insertion in the opening through a body or bodies to be handled and thereafter moved apart to effect engagement of the said parts with spaced portions of said openings in the said bodies to grip the latter.

13. A material handling apparatus as defined in claim 12 and further comprising an operator's cab mounted upon said carrier means for movement therewith with the control means for governing the operation of the means for producing relative movement of said parts of said U-shaped member located in said cab.

14. A material handling apparatus as defined in claim 12 in combination with a warehouse comprising a floor having vertical support members for supporting annular bodies with their axes vertical and arranged so that the stored bodies are accessible from above and so that at least part of the stored bodies are inaccessible to a worker on the floor level of the warehouse, said material handling apparatus being supported for movement above said vertical support members.

15. A material handling apparatus comprising an overhead substantially horizontally extending support, carrier means movable along said support, a plurality of cables depending from said carrier means, a substantially U-shaped member having one leg connected to said cables and the other leg adapted to be inserted in central openings of bodies to be handled, means on said carrier means for raising and lowering said cables to effect selective raising and lowering of said member and tilting thereof relative to said carrier means, the said other leg of the said member comprising substantially parallel extending interconnected parts, power operated means carried by said member for producing relative movement of said parts selectively towards and away from each other whereby the said parts may be disposed closely adjacent each other for insertion in the opening through a body or bodies to be handled and thereafter moved apart to effect engagement of the said parts with spaced portions of said openings in the said bodies to grip the latter, movable finger-like members mounted on said other leg adjacent the free end thereof, power operated means to move said finger-like members relative to said other leg to positions extending substantially transversely outwardly therefrom, and means for effecting sequential actuation of the said power operated means to thereby sequentially effect relative movement of the said parts of said member and movement of said finger-like members.

16. A material handling apparatus as defined in claim 15 and in which the means for moving said parts and said finger-like members comprise fluid pressure actuators, a source of fluid pressure carried by said U-shaped member, valve means for controlling the application of fluid pressure to said actuators and means operatively connected with said valve means to control operation of the latter at a location remote therefrom.

17. A material handling apparatus comprising a substantially U-shaped member, one leg of which is adapted to be inserted in central openings of bodies to be handled, means supporting said member for overhead movement, power operated means for horizontally moving said member to various desired positions relative to said supporting means, power operated means for raising and lowering said member and for tilting said member relative to said supporting means, the said one leg of said member comprising substantially parallel extending interconnected parts, power operated means to produce relatively transverse movement between said parts selectively towards and away from each other whereby the parts may be disposed closely adjacent each other for insertion into the openings of bodies to be handled and thereafter laterally moved to effect engagement of said parts with spaced portions of said openings in the said bodies to grip the latter and prevent displacement thereof relative to said member when the latter is moved to various positions, separately operated actuated control means for each of said power operated means located at a station remote from said U-shaped member, movable fingerlike members mounted on said one leg adjacent the free end thereof, and power operated means to move said fingerlike members relative to said one leg to positions extending substantially transversely outwardly therefrom.

References Cited in the file of this patent

UNITED STATES PATENTS

| Number | Name | Date |
|---|---|---|
| 131,221 | Keiser | Sept. 10, 1872 |
| 220,300 | Morgan | Oct. 7, 1879 |
| 397,750 | Phinney | Feb. 12, 1889 |
| 584,906 | Tribolet | June 22, 1897 |
| 992,307 | Weickel et al. | May 16, 1911 |
| 1,203,586 | Cowles | Nov. 7, 1916 |
| 1,210,393 | Amman | Jan. 2, 1917 |
| 1,493,953 | Bolgiano | May 13, 1924 |
| 1,546,364 | Bennington | July 21, 1925 |
| 1,605,273 | Norton et al. | Nov. 2, 1926 |
| 1,661,386 | Remde | Mar. 6, 1928 |
| 1,694,084 | Straight | Dec. 4, 1928 |
| 1,697,538 | Moore | Jan. 1, 1929 |
| 1,717,194 | Daoust | June 11, 1929 |
| 1,868,562 | Chubb et al. | July 26, 1932 |
| 2,234,438 | Kothny | Mar. 11, 1941 |
| 2,281,103 | MacDonald | Apr. 28, 1942 |
| 2,366,065 | Sieurin | Dec. 26, 1944 |
| 2,412,844 | Stevens | Dec. 17, 1946 |
| 2,444,122 | Wahl | June 29, 1948 |
| 2,536,720 | Brightly | Jan. 2, 1951 |